(12) United States Patent
Franca-Neto et al.

(10) Patent No.: US 8,411,390 B2
(45) Date of Patent: Apr. 2, 2013

(54) INTEGRATED HALF COIL STRUCTURE FOR WRITE ASSIST OF HIGH COERCIVITY MEDIA

(75) Inventors: Luiz M. Franca-Neto, Sunnyvale, CA (US); Bernhard E. Knigge, San Jose, CA (US); Petrus Antonius Van Der Heijden, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 777 days.

(21) Appl. No.: 12/589,038

(22) Filed: Oct. 16, 2009

(65) Prior Publication Data

US 2011/0090596 A1    Apr. 21, 2011

(51) Int. Cl.
G11B 5/17    (2006.01)
G11B 5/187    (2006.01)

(52) U.S. Cl. ......... 360/123.06; 360/123.03; 360/123.11; 360/125.3; 360/128

(58) Field of Classification Search ............. 360/123.02, 360/123.03, 123.06, 123.11, 123.12, 128, 360/125.3
See application file for complete search history.

(56) References Cited

U.S. PATENT DOCUMENTS

| | | | |
|---|---|---|---|
| 3,611,329 A | 10/1971 | Lee et al. | |
| 4,317,148 A | 2/1982 | Chi | |
| 5,587,851 A | 12/1996 | Ishii | |
| 5,995,329 A | 11/1999 | Shiraishi et al. | |
| 6,198,335 B1 | 3/2001 | Pakriswamy | |
| 6,219,193 B1 | 4/2001 | Janz | |
| 6,349,009 B1 | 2/2002 | Dakroub et al. | |
| 6,665,136 B2 | 12/2003 | Clinton et al. | |
| 6,717,770 B1 | 4/2004 | Crawford | |
| 6,795,263 B2 | 9/2004 | Kuroe et al. | |
| 6,891,700 B2 | 5/2005 | Shiraishi et al. | |
| 6,992,850 B2 | 1/2006 | Nishiyama | |
| 7,070,716 B2 | 7/2006 | Lam | |
| 7,072,142 B2 | 7/2006 | Lam | |
| 7,092,186 B1 | 8/2006 | Hog | |
| 7,212,367 B2 | 5/2007 | Clinton et al. | |
| 7,256,955 B2 | 8/2007 | Pokhil et al. | |
| 7,394,605 B2 | 7/2008 | Amemiya | |

(Continued)

FOREIGN PATENT DOCUMENTS

| | | |
|---|---|---|
| JP | 4188404 | 7/1992 |
| JP | 5234170 | 9/1993 |

(Continued)

OTHER PUBLICATIONS

Zhu et al., Microwave Assisted Magnetic Recording, IEEE Trans on Magn, vol. 44, No. 1, Jan. 2008, p. 125-131.

*Primary Examiner* — Will J Klimowicz
(74) *Attorney, Agent, or Firm* — D'Arcy H. Lorimer; Lorimer Labs

(57) ABSTRACT

A structure for providing two write assist components for perpendicular thin film heads writing to high coercivity media is disclosed. The two components provided by the present invention include a media writing assist component and a head switching assist component. The structure includes an auxiliary half coil surrounding the pole tip at the ABS, and includes conductive elements running parallel to the pole layer which are connected to the auxiliary half coil. Integrated heat sinks located at either the ABS or at a recessed position are provided. The conductive elements can prove either symmetric or asymmetric current feed geometries, which allow differential or common mode current flow to the half coil.

23 Claims, 24 Drawing Sheets

U.S. PATENT DOCUMENTS

| | | | |
|---|---|---|---|
| 7,869,309 B2 * | 1/2011 | Mihalcea et al. | 369/13.14 |
| 2005/0280935 A1 * | 12/2005 | Clinton et al. | 360/125 |
| 2006/0176601 A1 | 8/2006 | Amin et al. | |
| 2007/0253106 A1 | 11/2007 | Sato et al. | |
| 2008/0112080 A1 | 5/2008 | Lengsfield et al. | |
| 2008/0112087 A1 | 5/2008 | Clinton et al. | |
| 2008/0151436 A1 | 6/2008 | Sato et al. | |
| 2008/0218891 A1 | 9/2008 | Gubbins et al. | |
| 2010/0149675 A1 * | 6/2010 | Mallary et al. | 360/51 |

FOREIGN PATENT DOCUMENTS

| | | |
|---|---|---|
| JP | 6084103 | 3/1994 |

* cited by examiner

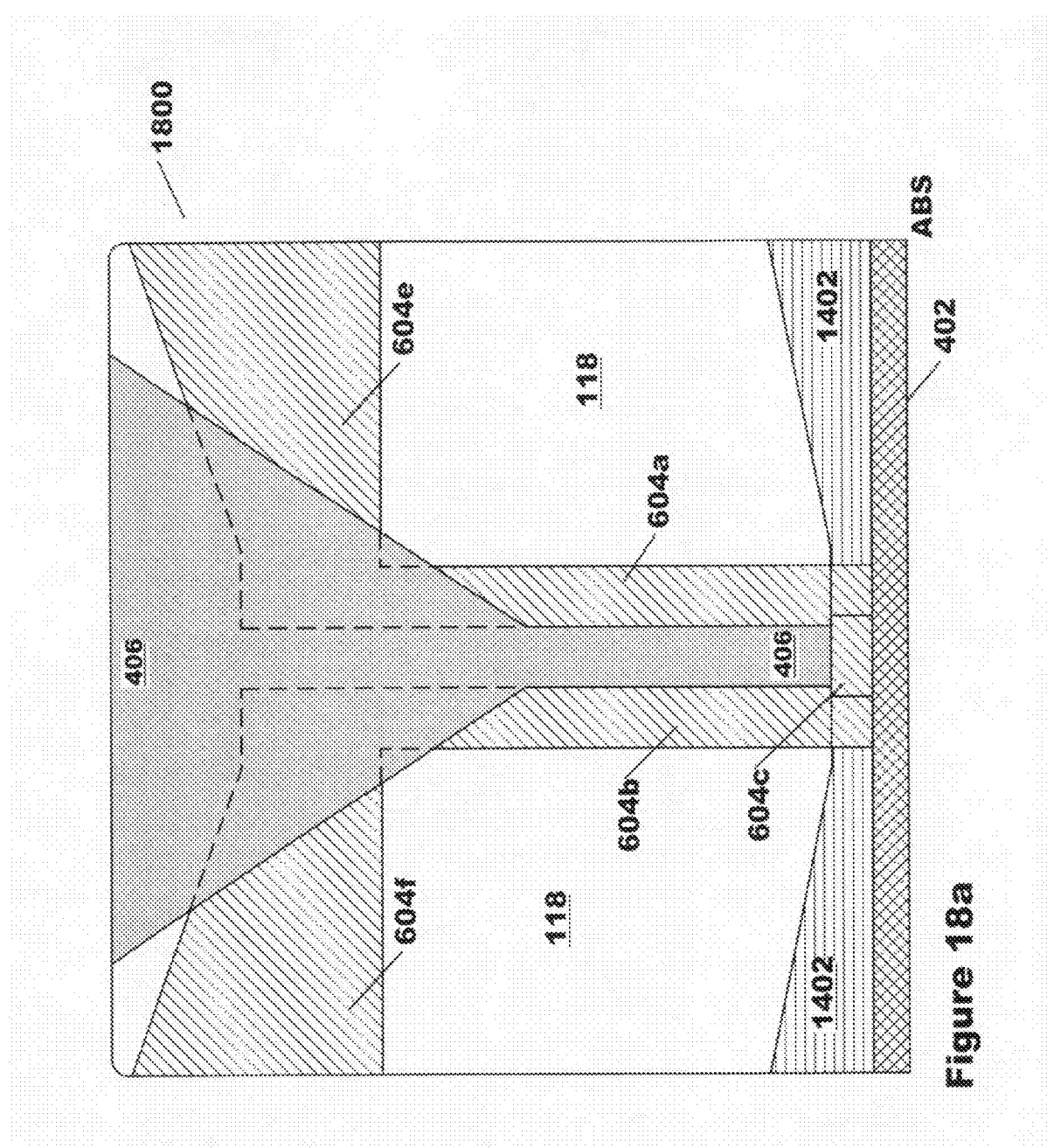

INTEGRATED HALF COIL STRUCTURE FOR WRITE ASSIST OF HIGH COERCIVITY MEDIA

BACKGROUND OF THE INVENTION

1. Field of the Invention

This invention relates to thin film perpendicular magnetic head structures. Specifically, the invention relates to structures for employing secondary half coils to aid in writing signals to high coercivity media.

2. Description of the Related Art

As bit areal densities in magnetic recording continue to progress in an effort to increase the storage capacity of hard disc drives, magnetic transition dimensions and recording head critical features are continuing to shrink. To make the recording medium stable at higher areal bit densities, magnetically harder medium materials having higher coercivity are required. Typically, writing to a harder medium has been achieved by increasing the saturation magnetization of the magnetic material comprising the inductive write head, however the current art is rapidly reaching the limits of known materials in this regard. A further consequence of higher areal densities is a resultant increase in data rates. At very high data writing rates, it becomes increasingly difficult to switch the magnetization of the recording medium using a conventional write field.

One technology proposed to overcome some of the afore mentioned difficulties is the wire amplified magnetic recording head (WAMR), which utilizes a single ampere wire surrounding three sides of a pole tip. Used as the only magnetic field producing element, the ampere wire has the potential to produce higher writing speeds and data rates (due to it's lower inductance) and a better confined cross track profile. Such a device is disclosed by Clinton et al. in, for example, U.S. Pat. Nos. 7,212,367; 7,149,055; 6,665,136; and US Patent Publication 2008/0112087. In the devices disclosed by Clinton et al., the ampere wire is the main coil for writing the data signals to the media. In some embodiments, an RF AC signal is simply added to the data signal being written by the ampere wire to aid in switching the media. One of the main difficulties of using an ampere wire to write data is the very large current densities required to get a large enough field. These high current densities can produce high temperatures in the ampere wire which may lead to unwanted diffusion and electromigration in the wire and pole tip. In an attempt to control temperatures, heat sink structures located at the ABS are employed to cool the wire as well as deliver current to the wire element itself. However, due to the small cross sectional area of the ampere wire element, cooling by conduction out of the wire is of limited utility.

What is needed is improved methods and structures for writing data to high coercivity media.

FIG. 1 (Prior Art), is a partial cross section view 100 of a typical perpendicular thin film head having a conventional coil. The head comprises shield layers 102, 104; read element 103; shaping layer 110; coil structure 108; main pole 112; lower return pole layer 106; shield 114; filler layer 118; and upper return pole layer 116. Structure 114 may be a trailing shield or wrap around shield. Details of wrap around shields and trailing shields, as applied to perpendicular recording heads, can be found in, for example, US Patent Application Publications 2007/0146930, 2007/0115584, 2006/0174474, 2006/0044682, and 2007/0137027.

FIG. 2 (Prior Art), is a simplified ABS (air bearing surface) view 200 of a WAMR head. In this head structure, ampere wire 204 surrounds three sides of main pole 112 (the pole tip), and is fed write current via conductive element 202, which also serves as a heat sink for heat generated by the ampere wire 204. The ampere wire must have a small cross sectional area to minimize the separation of the pole 112 from the shield elements 114, 115a, and 115b. The low inductance of the ampere wire 204 combined with the small cross sectional area results in very high current densities at fields strong enough to write to high coercivity media. These high currents can create locally high temperatures, particularly in the ampere wire section above the pole tip furthest from the heat sink connections. These high temperatures are undesirable as they induce electromigration and diffusion of components in and surrounding the ampere wire.

FIG. 3 (Prior Art) is a partial cross section view 300 of a WAMR head. In this structure the conventional coil 108 of FIG. 1 has been replaced with the ampere wire 204 and heat sink/conductors 202.

SUMMARY OF THE INVENTION

It is an object of the present invention to provide a perpendicular head including a pole layer having a flare point; a main coil main coil having a plurality of turns operable to affect the magnetization state of the pole layer; an auxiliary half coil, extending around three sides of the pole layer at the air bearing surface and having a first terminating end and a second terminating end; a first conductive element coupled to the first terminating end of the auxiliary half coil, the first conductive element extending from the air bearing surface, approximately perpendicular to the air bearing surface, to beyond the flare point of the pole layer; and a second conductive element coupled to the second terminating end of the auxiliary half coil, the second conductive element extending from the air bearing surface, approximately perpendicular to the air bearing surface, to beyond the flare point of the pole layer.

BRIEF DESCRIPTION OF THE DRAWINGS

The present invention will be better understood when consideration is given to the following detailed description thereof. Such description makes reference to the annexed drawings, wherein:

FIG. 18a is a plan view of an auxiliary half coil having both recessed heat sinks and electrically insulating heat sinks at the ABS, in accordance with an embodiment of the present invention;

DETAILED DESCRIPTION OF THE PREFERRED EMBODIMENTS

Figure 1:
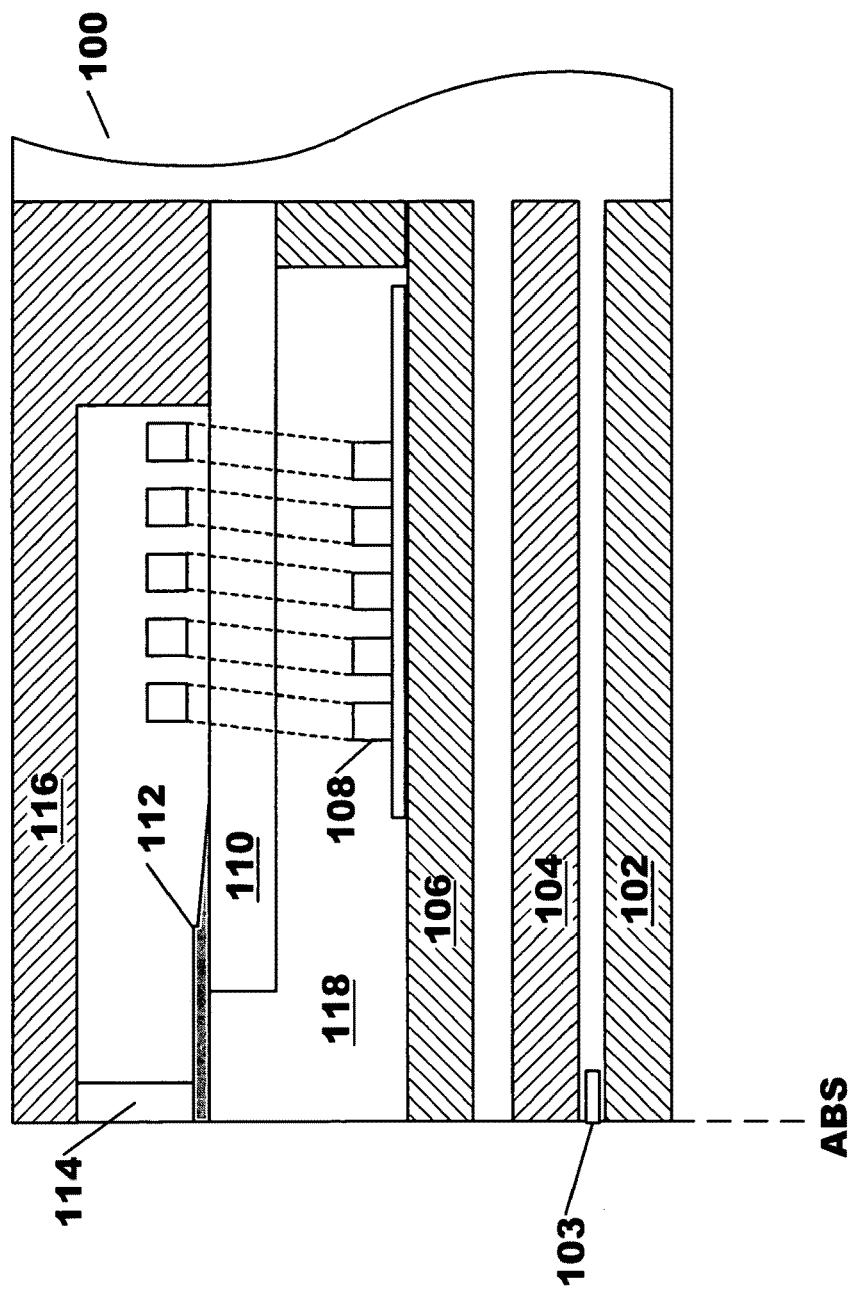
FIG. 1 (Prior Art), is a partial cross section view of a typical perpendicular thin film head having a conventional coil.
Figure 2:
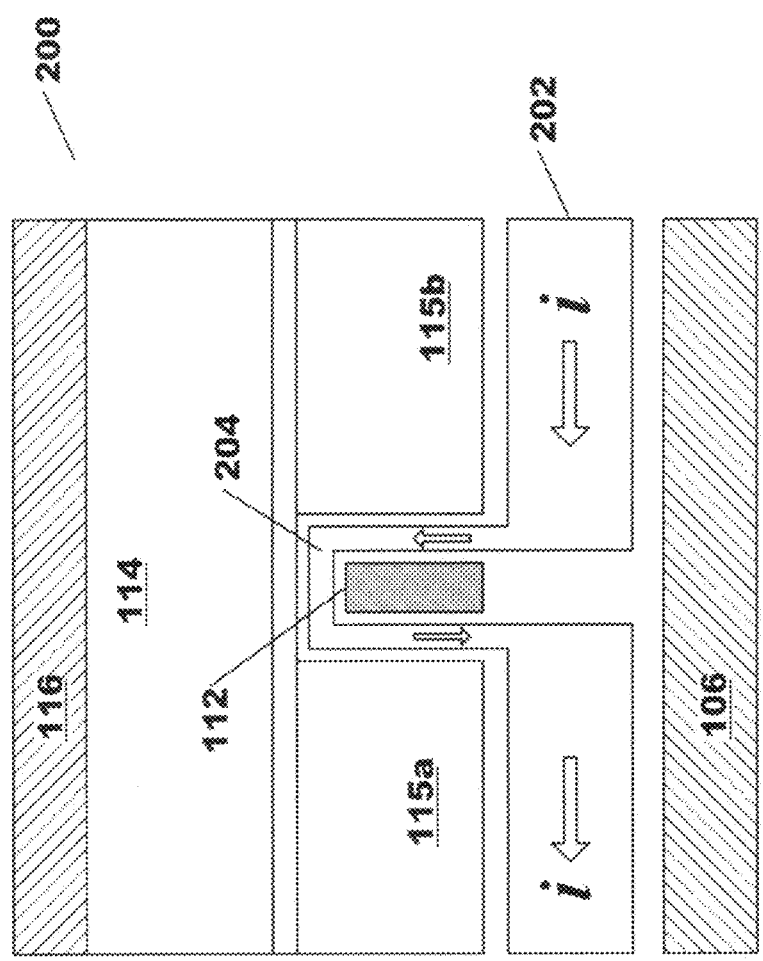
FIG. 2 (Prior Art), is a simplified ABS (air bearing surface) view of a WAMR head.
Figure 3:
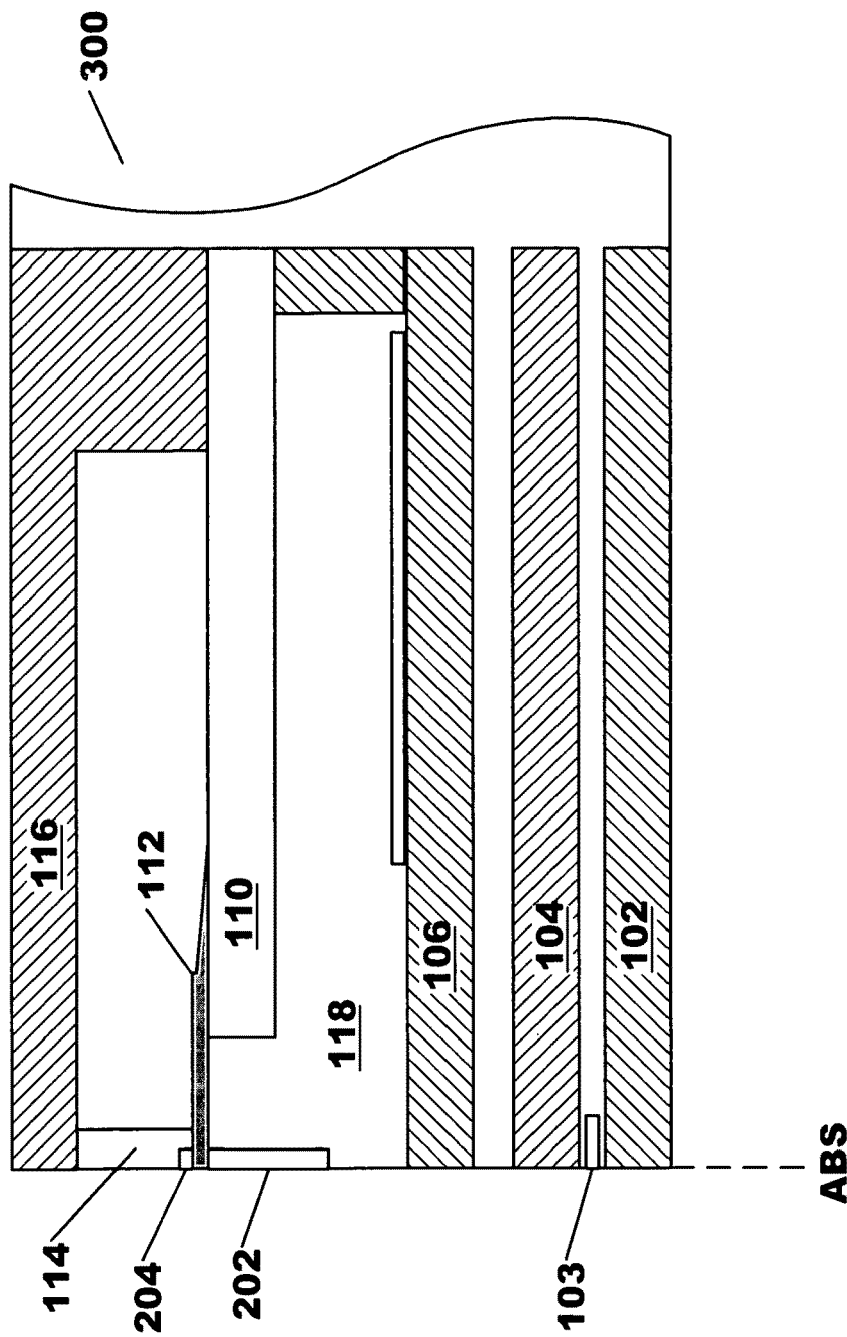
FIG. 3 (Prior Art) is a partial cross section view 300 of a WAMR head.

FIGS. 1-3 (Prior Art) have been discussed above.

The present invention serves to improve upon the previously disclosed WAMR head configurations in a number of ways. Firstly, the present invention utilizes a conventional main coil structure (as in 108 of FIG. 1) in combination with an auxiliary half coil. This significantly reduces the current density in the half coil, which reduces heat sinking requirements, lowers temperatures, and reduces or prevents damaging electromigration and diffusion effects at the half coil. Further, the present invention adds conductive elements that run parallel to the pole layers to add a head switching assist function to the half coil. The half coil serves to introduce RF signals or data-derived special signals which are utilized to both aid in writing to the media and improve switching of the head. The half coil may be connected in parallel with the conventional main coil or may be connected to a separate circuit.

Figure 4:
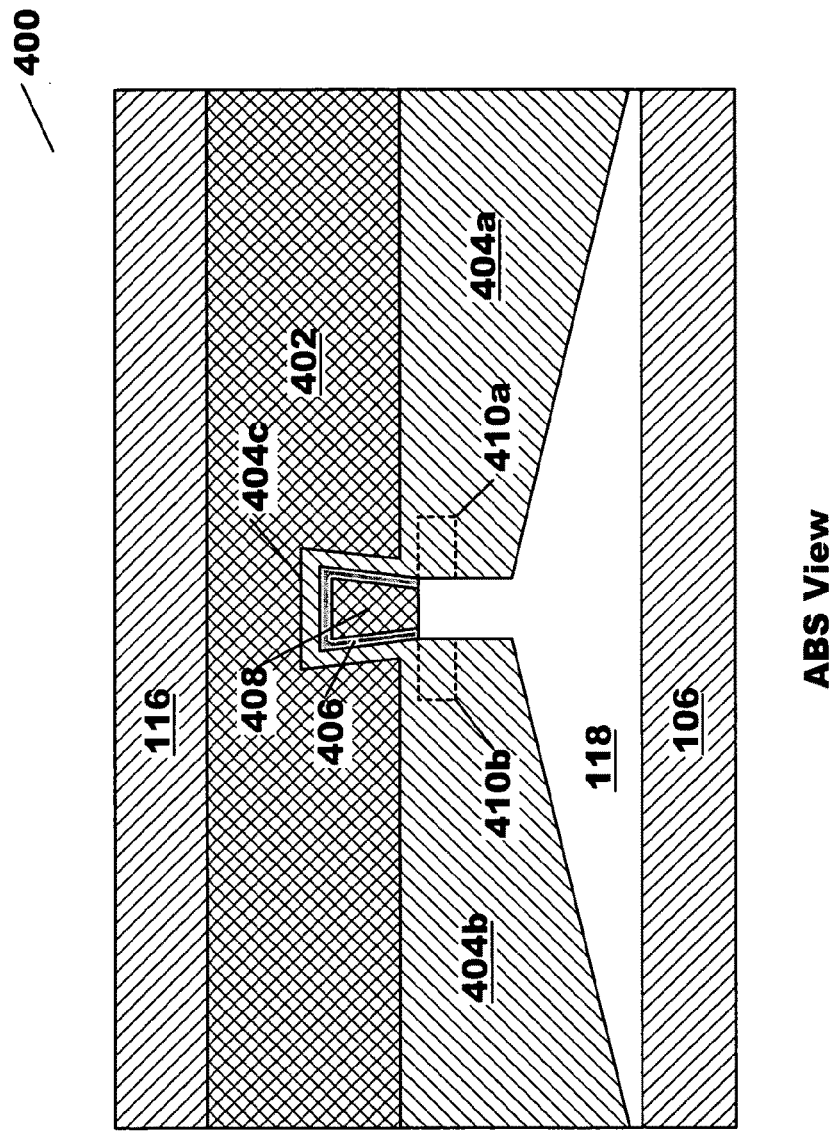
FIG. 4 is an ABS view of an auxiliary half coil having heat sinks at the ABS, in accordance with an embodiment of the present invention.

FIG. 4 is an ABS view 400 of an auxiliary half coil 404c having heat sinks 404a,b at the ABS, in accordance with an embodiment of the present invention. In this view, pole tip 408 is encircled on three sides by half coil 404c. Layer 406 is a low conductivity (relative to the half coil), non magnetic layer that effectively electrically isolates half coil 404c from pole tip 408. Preferably, the heat sink electrical conductivity should be less than about 20% of the half coil, to minimize any parasitic effects. In this embodiment, the half coil 404c is integrally connected to heat sink sections 404a and 404b. Preferably, heat sink sections 404a, 404b and half coil 404c all comprise the same material. Electrical current is delivered to half coil 404c by electrical conductive members 410a and 410b, which are not directly visible in FIG. 4. Note that these conductors reside below the plane upon which the pole layer is deposited. Wrap around shield 402 surrounds the half coil 404c. An insulating layer (not shown) may also be used between half coil 404c and shield 402 if desired. Since half coil 404c is placed between the pole 406 and the shield 402, it increases the effective gap, and therefore should be kept as thin as possible. Increasing the gap reduces the effectiveness of the shield. However, thinner half coils will be limited to lower total current flows to keep resistive heating at high current densities in check. For this reason, a single coil WAMR implementation having very high currents may not be practical for perpendicular heads with wrap around shields. In the present invention, current flows can be kept low since the half coil is an auxiliary coil, and does not carry the burden of writing data to the media.

In the embodiment of FIG. 4, heat sink sections 404a,b, conductor elements 410a,b, and half coil 404c are made of non-magnetic metals, preferably low conductivity metals, such as precious metals or copper, that are stable and not prone to corrosion during manufacturing or operation of the half coil. Pole 406 and shield 402 are comprised of the appropriate magnetic alloys, as are known to those skilled in the art. Layer 406 may be comprised of an insulator such as alumina, silicon dioxide, or any other similar material as is known in the art.

Figure 5:
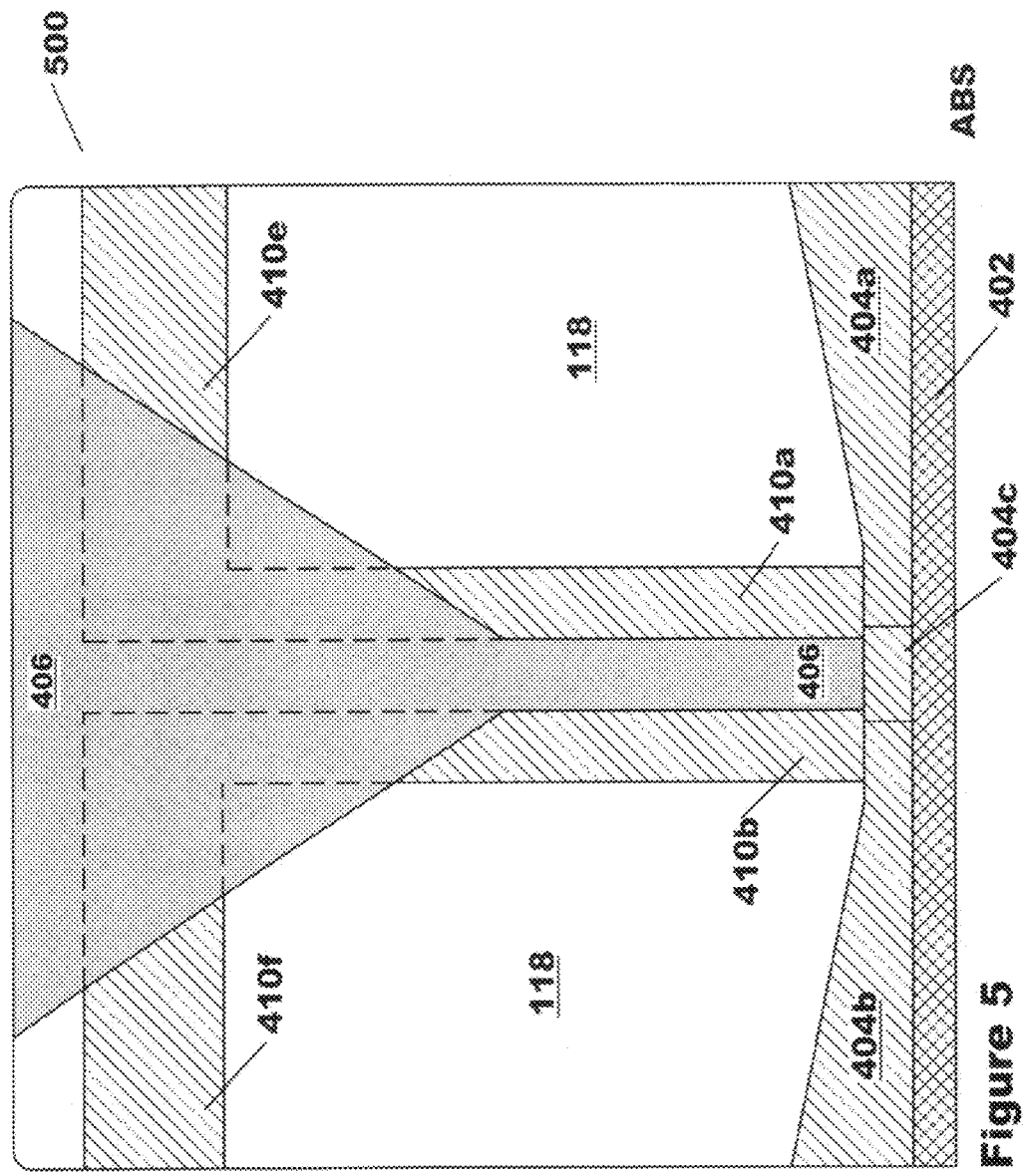
FIG. 5 is a partial plan view of the structure disclosed in FIG. 4, in accordance with an embodiment of the present invention.

FIG. 5 is a partial plan view 500 of the structure disclosed in FIG. 4, in accordance with an embodiment of the present invention. Note that this is a plan view of the structure of FIG. 4 with layer 116 and any filler layers above insulating layer 406 (such as portions of filler layer 118) removed. Conductive elements 410e, 410a, 410b, and 410f deliver electrical current to half coil 404c. Conductive elements 410a and 410b are deliberately placed to run parallel to the pole (under layer 406), past the "flare point" where the pole begins to increase in width. As is shown in FIG. 4, these conductors are also below the base plane of the pole layer. The purpose of this geometry is to provide an additional writing assist function via the auxiliary half coil. If an appropriate common mode RF current or data-derived signal current is produced in both conductors 410a and 410b, an in-plane horizontal magnetic field is induced at the pole tip, which provides a head switching assist function that further improves writing data to the media. Please see the discussion of FIGS. 20-22 for further explanation. For future reference, this geometry (having the current feed conductors symmetrically located with respect to the pole) shall be referred to as "symmetric feed".

If an appropriate differential mode RF current is produced in conductors 410a and 410b, flowing through half coil 404c, a media writing assist function is produced that also improves writing data to the media. Please see the discussion of FIGS.

20-22 for further explanation. It is an advantage of the present invention that both the head switching assist function and the media writing assist function can be utilized together and are complementary.

The embodiments of FIGS. 4 and 5 have a number of advantages over the prior art. In prior art WAMR heads, current flows through the heat sink sections (i.e. 202 in FIG. 2) through the half coil, and conductors 410 are absent. So there is no head switching assist field generated because there is no current flow parallel to the pole. These embodiments of the present invention maintain the utility of a heat sink mounted at the ABS. Heat is transferred to the heat sinks 404a,b by thermal conduction from half coil 404c, as conductors 410a,b provide limited heat conduction from the coil 404c. Heat sinks 404a,b may also provide a conduction path for common mode current to ground via a parasitic capacitance, although they do not carry any differential mode current as in WAMR heads of the prior art. The geometry of the heat sinks may be used by designers to adjust the capacitance coupling effect so that other parameters in the circuitry providing the common mode current can be tuned.

Figure 6:
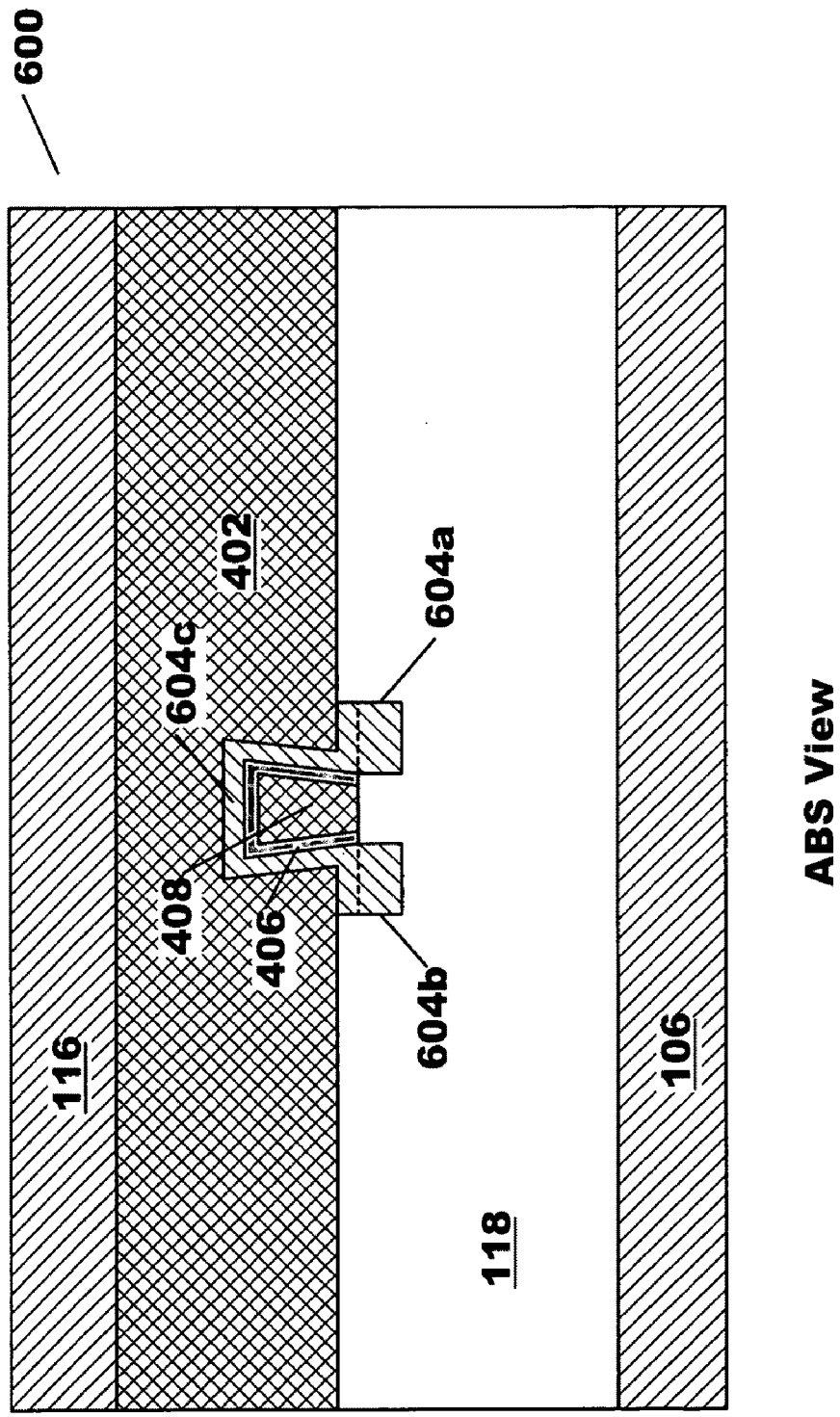
FIG. 6 is an ABS view of an auxiliary half coil having recessed heat sinks, in accordance with an embodiment of the present invention.
Figure 7:
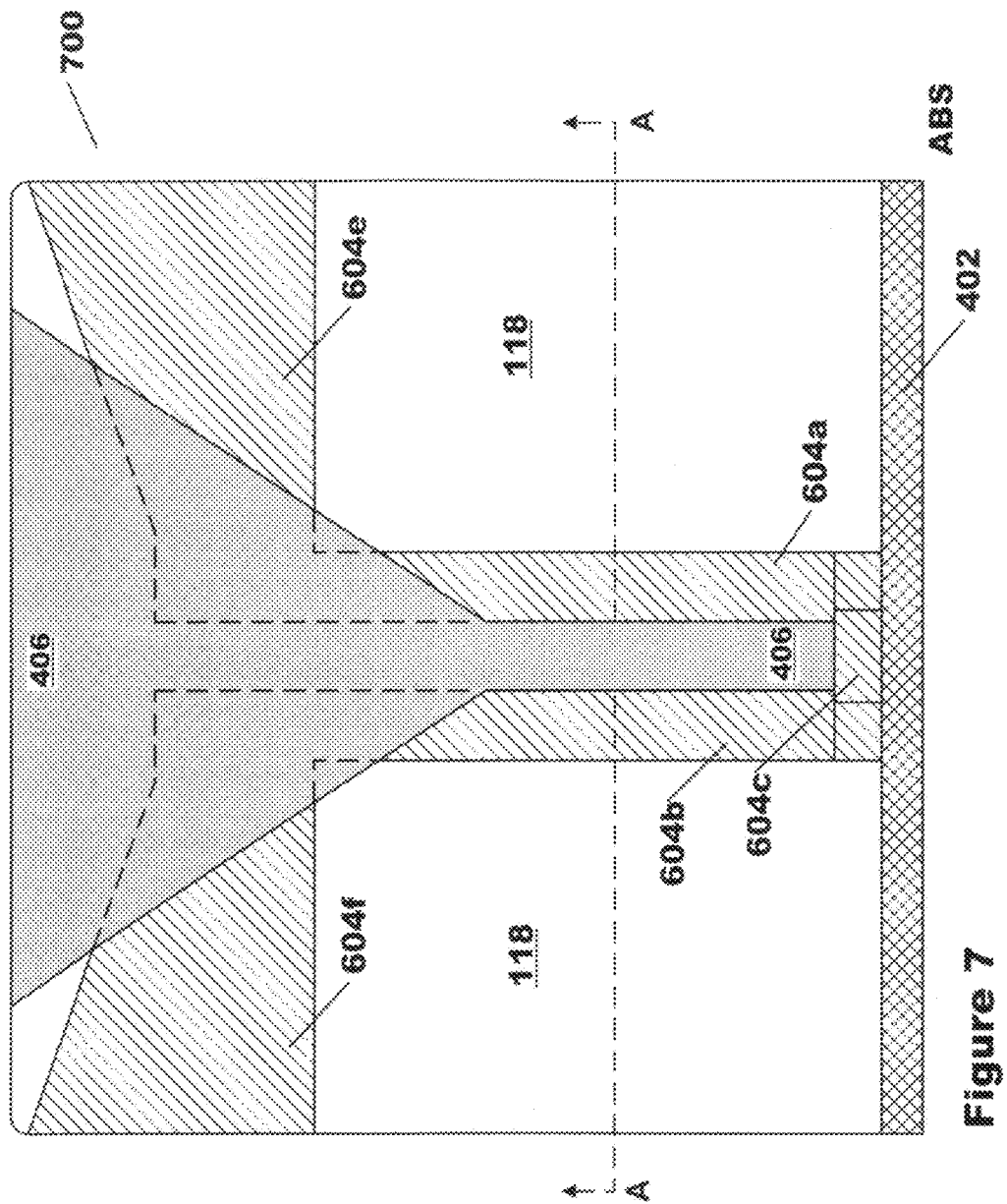
FIG. 7 is a partial plan view of the structure disclosed in FIG. 6, in accordance with an embodiment of the present invention.
Figure 8:
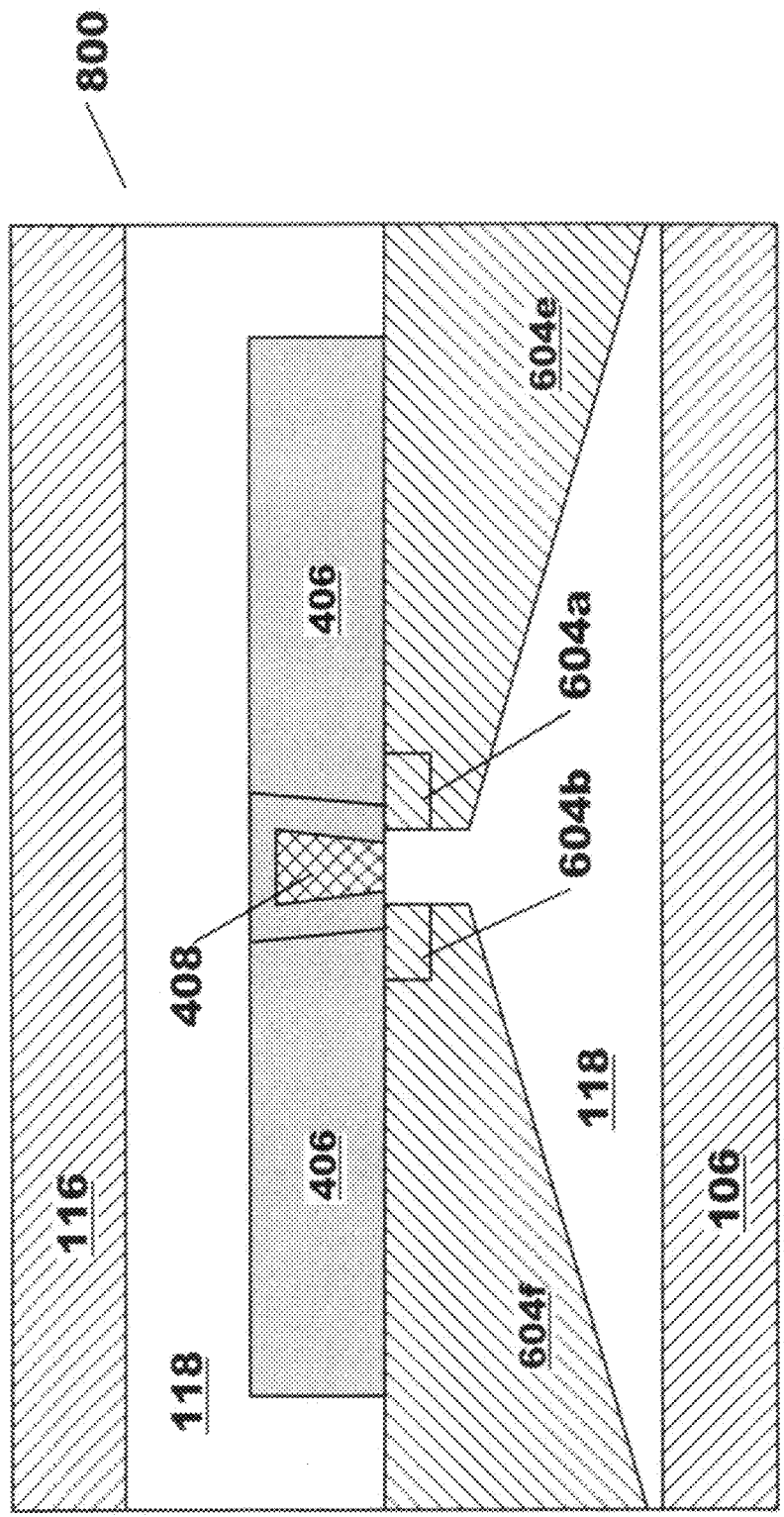
FIG. 8 is a partial cross section view through section A-A in FIG. 7, in accordance with an embodiment of the present invention.

FIG. 6 is an ABS view 600 of an auxiliary half coil 604c having recessed heat sinks 604e,f, in accordance with an embodiment of the present invention. FIG. 7 is a partial plan view 700 of the structure disclosed in FIG. 6. Note that this is a plan view of the structure of FIG. 6 with layer 116 and any filler layers above insulating layer 406 (such as portions of filler layer 118) removed. FIG. 8 is a partial cross section view 800 through section A-A in FIG. 7. Portions of filler layer 118 are transparent to clarify details. In this embodiment of the present invention, the heat sinks 604e and 604f have been recessed from the ABS, beyond the flare point of the pole (under layer 406). Conductive members 604a and 604b serve the dual purpose of conducting heat generated in half coil 604c, and delivering current to and from the half coil. As in the embodiments of FIGS. 4 and 5, the conductors 604a and 604b are arranged as a symmetric feed configuration, which provides head switching assist with the appropriate common mode current and media writing assist with the appropriate differential mode current. In this embodiment, the heat sinks 604e,f carry both the common mode and differential mode current to half coil 604c via conductors 604a,b. Since conductors 604a,b also provide a heat conduction path to the heat sinks, they will be generally thicker and of greater cross section than those shown in FIGS. 4 and 5 (drawings are not to scale). They may also be constructed of a higher thermal conductivity metal.

Figure 9:
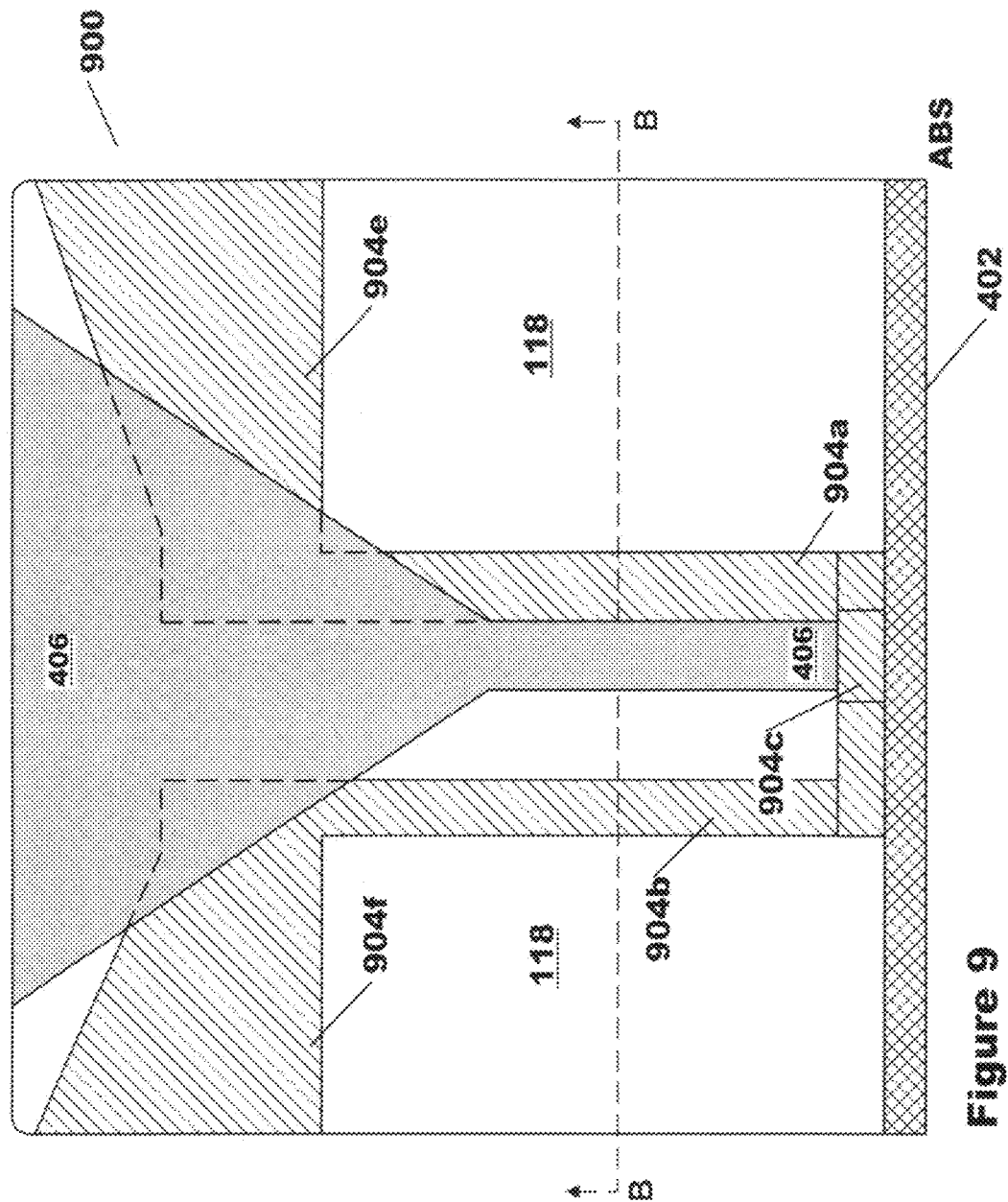
FIG. 9 is a partial plan view of an auxiliary half coil having recessed heat sinks and an asymmetric current feed, in accordance with an embodiment of the present invention.
Figure 10:
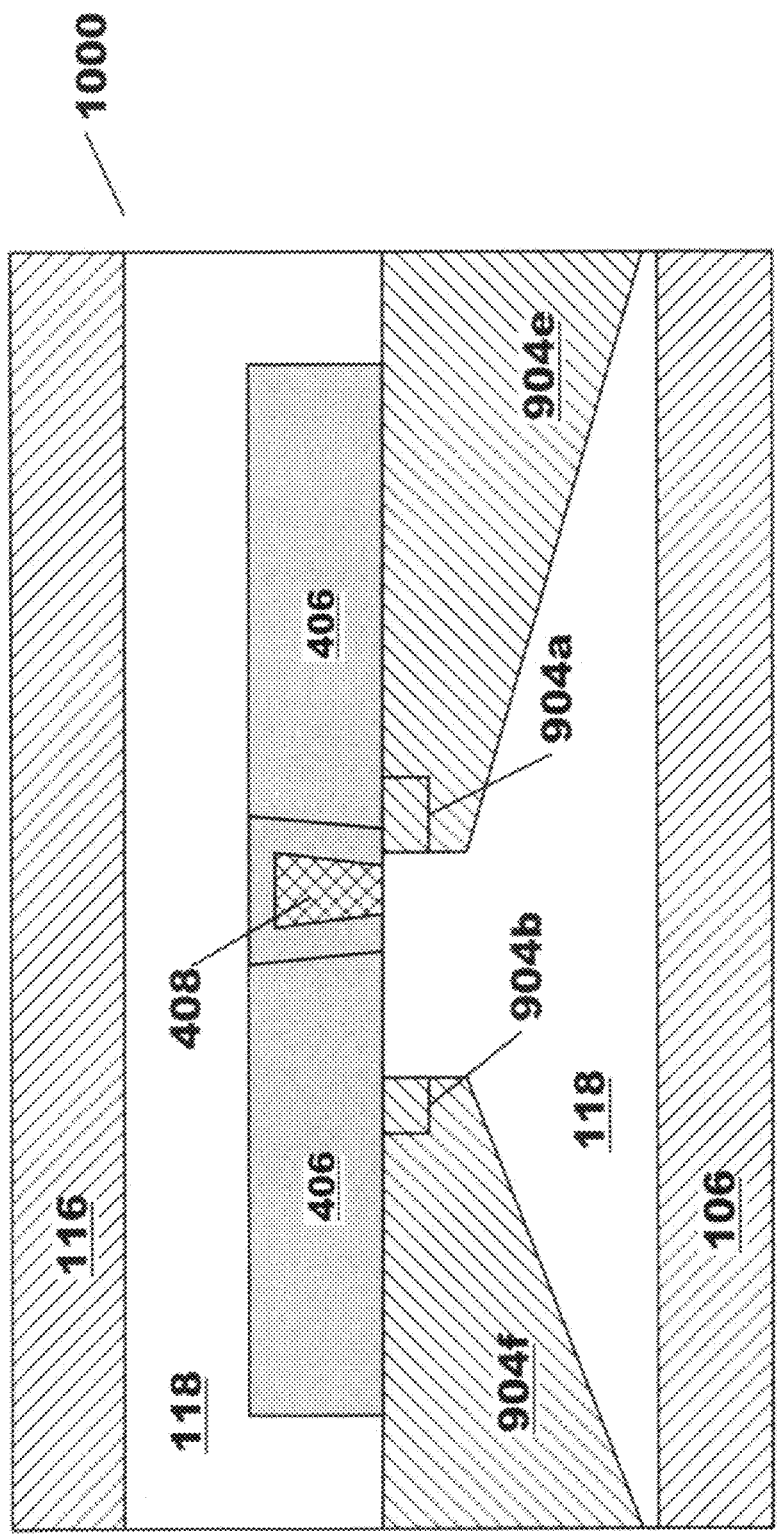
FIG. 10 is a partial cross section view through section B-B in FIG. 9, in accordance with an embodiment of the present invention.
Figure 11:
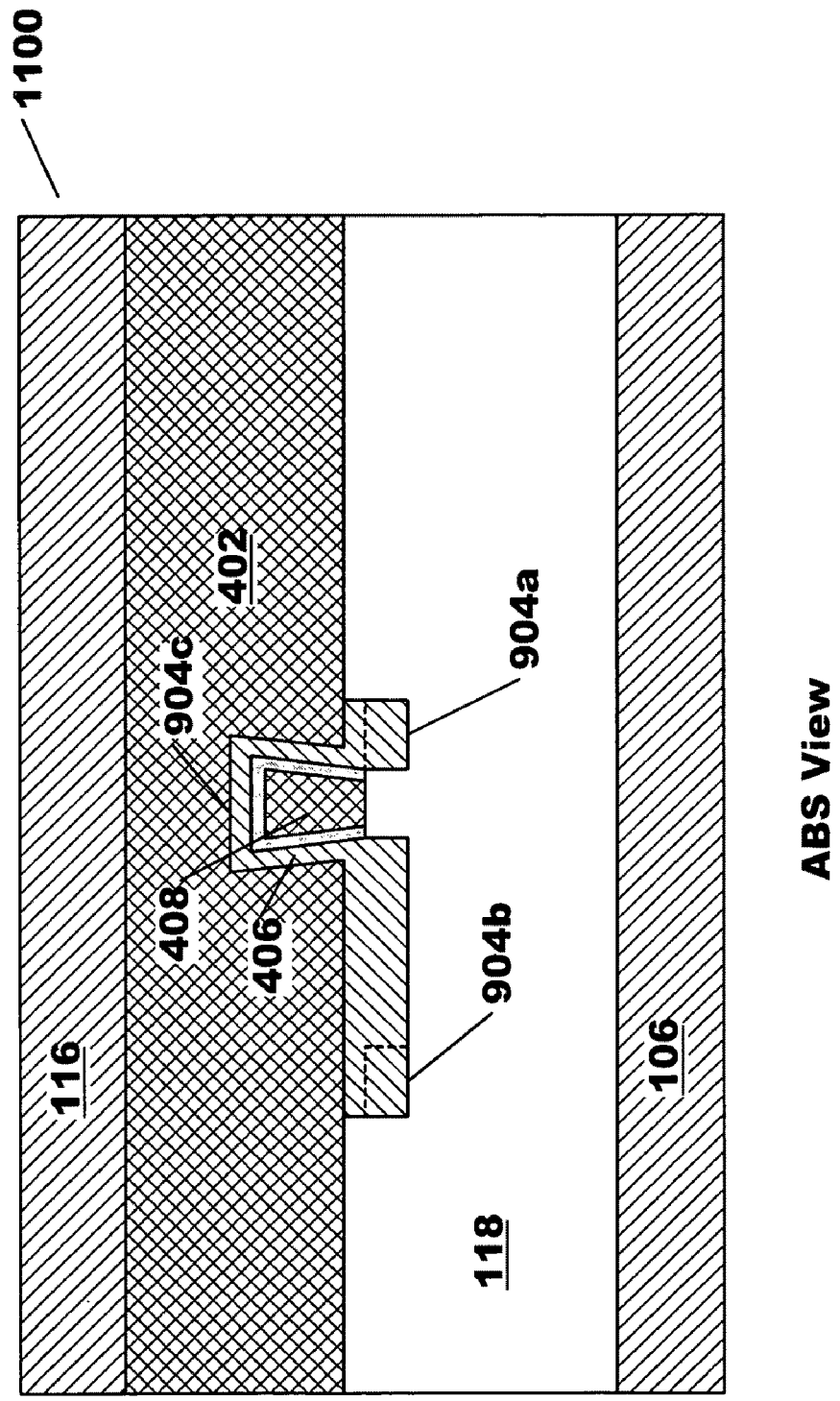
FIG. 11 is an ABS view of the structure of FIGS. 9 and 10, in accordance with an embodiment of the present invention.

FIG. 9 is a partial plan view 900 of an auxiliary half coil 904c having recessed heat sinks 904e,f and an asymmetric current feed, in accordance with an embodiment of the present invention. Note that this is a plan view with layer 116 and any filler layers above insulating layer 406 (such as portions of filler layer 118) removed. FIG. 10 is a partial cross section view through section B-B in FIG. 9. Portions of filler layer 118 are transparent to clarify details. FIG. 11 is an ABS view of the structure of FIGS. 9 and 10. In this embodiment of the present invention, the heat sinks 904e and 904f have been recessed from the ABS, beyond the flare point of the pole (under layer 406). Conductive members 904a and 904b serve the dual purpose of conducting heat generated in half coil 604c, and delivering current to and from the half coil. Unlike the previous embodiments of FIGS. 4-8, conductive members 904a, b are placed asymmetrically with respect to the pole. This is done to allow the use of both common mode and differential mode current flow for head switching assist. In the previous embodiments that utilize symmetric current feed geometries, there is no in-plane (horizontal) component of the magnetic field on the pole tip. To generate an in-plane magnetic field component, one conductor is displaced by an appropriate distance, which allows the horizontal field component from the conductor closest the pole (i.e. 904a) to be present at the pole tip, with a minor impact from the magnetic field gradient from current flowing in the displaced conductor (i.e. 904b). Please refer to FIGS. 20-23 for further explanation. Differential current flow may have some advantages from a circuit design perspective, in that the current is not dependent on parasitic capacitances as in the common mode case. Since the differential current flows from one heat sink, through the auxiliary half coil, to the other heat sink, the conductors can be isolated and grounding effects minimized. In this embodiment, as in previously described embodiments, differential current mode is also utilized for media writing assist.

Figure 12:
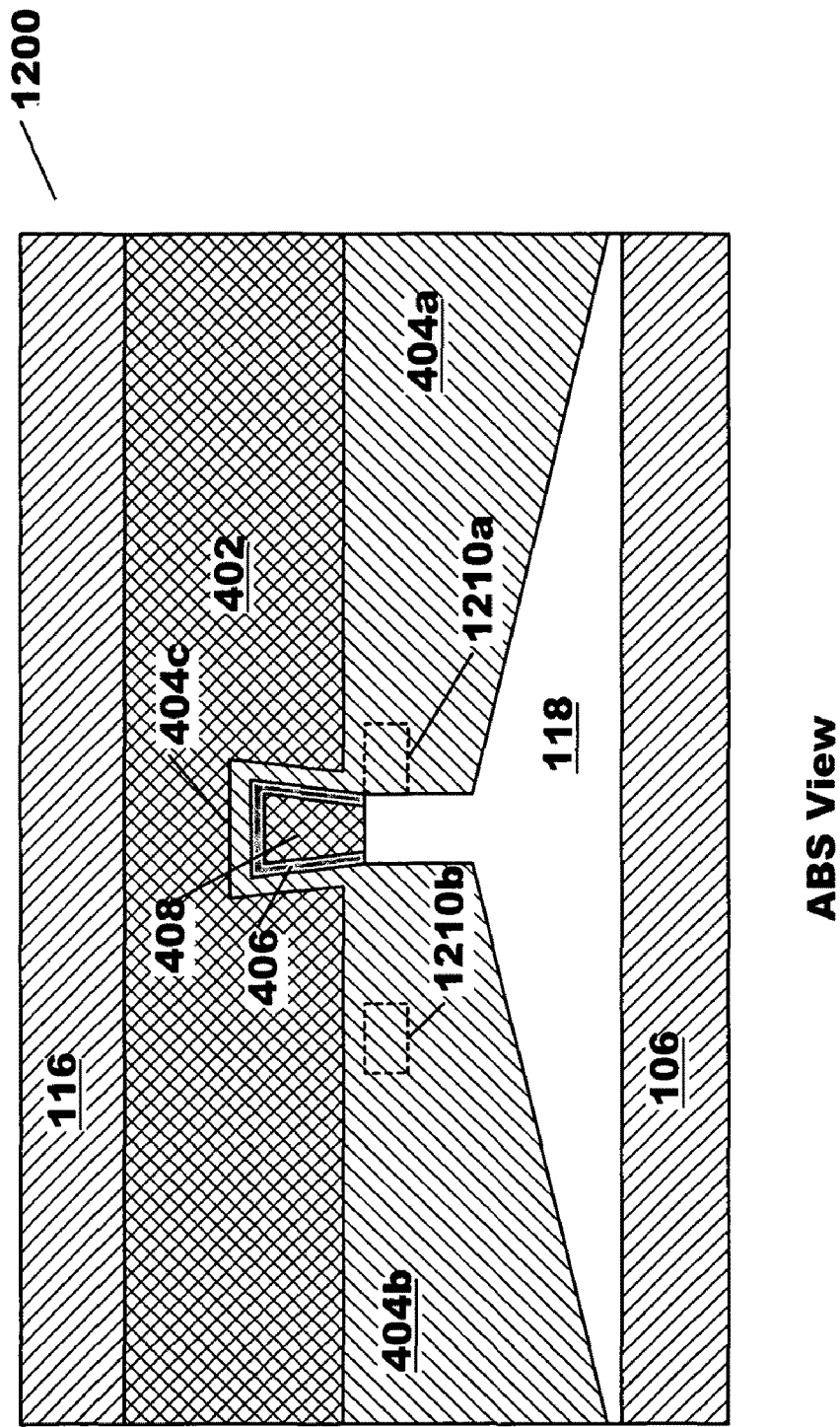
FIG. 12 is an ABS view of an auxiliary half coil having heat sinks at the ABS and an asymmetric current feed, in accordance with an embodiment of the present invention.
Figure 13:
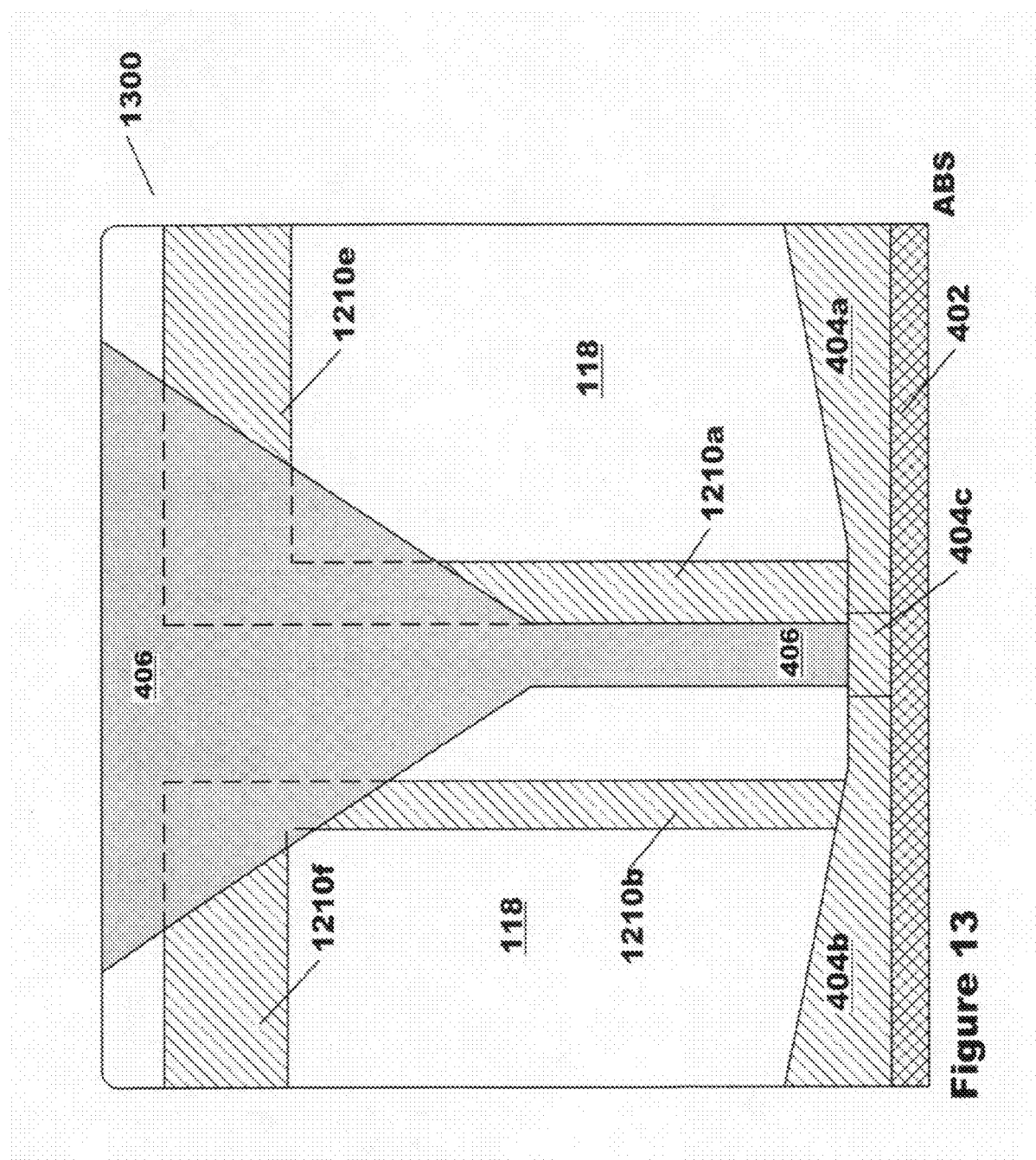
FIG. 13 is a partial plan view of the structure of FIG. 12, in accordance with an embodiment of the present invention.

FIG. 12 is an ABS view 1200 of an auxiliary half coil 404c having heat sinks 404a,b at the ABS and an asymmetric current feed, in accordance with an embodiment of the present invention. FIG. 13 is a partial plan view 1300 of the structure of FIG. 12. This embodiment is similar to the embodiments of FIGS. 4,5, with the exception that the symmetric current feed is replaced by an asymmetric current feed. Differential media writing assist and head switching currents flow through conductors 1210e, 1210a, 1210b, and 1210f to and from auxiliary half coil 404c.

Figure 14:
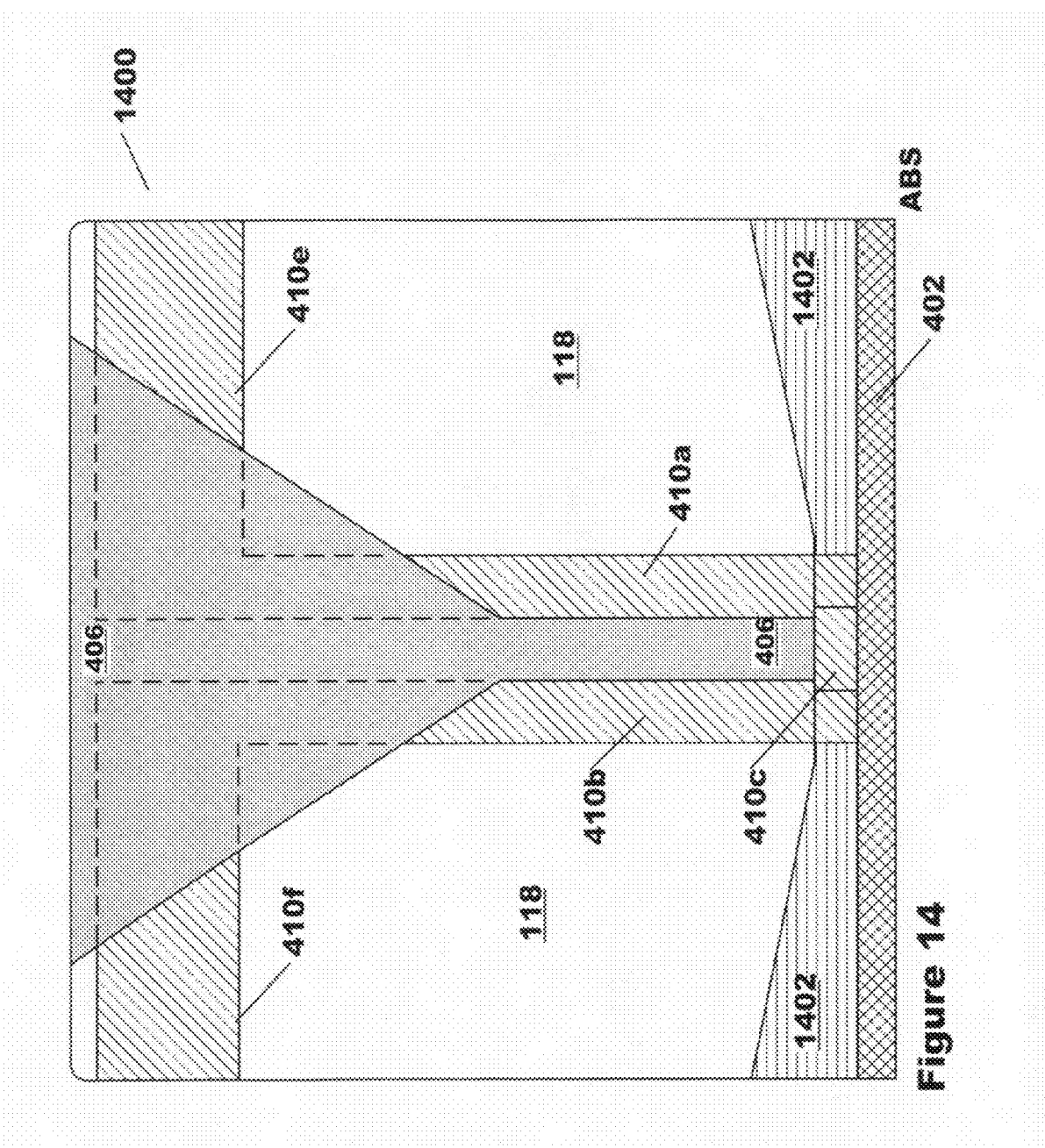
FIG. 14 is a partial plan view of an auxiliary half coil having electrically insulating heat sinks at the ABS, in accordance with an embodiment of the present invention.
Figure 15:
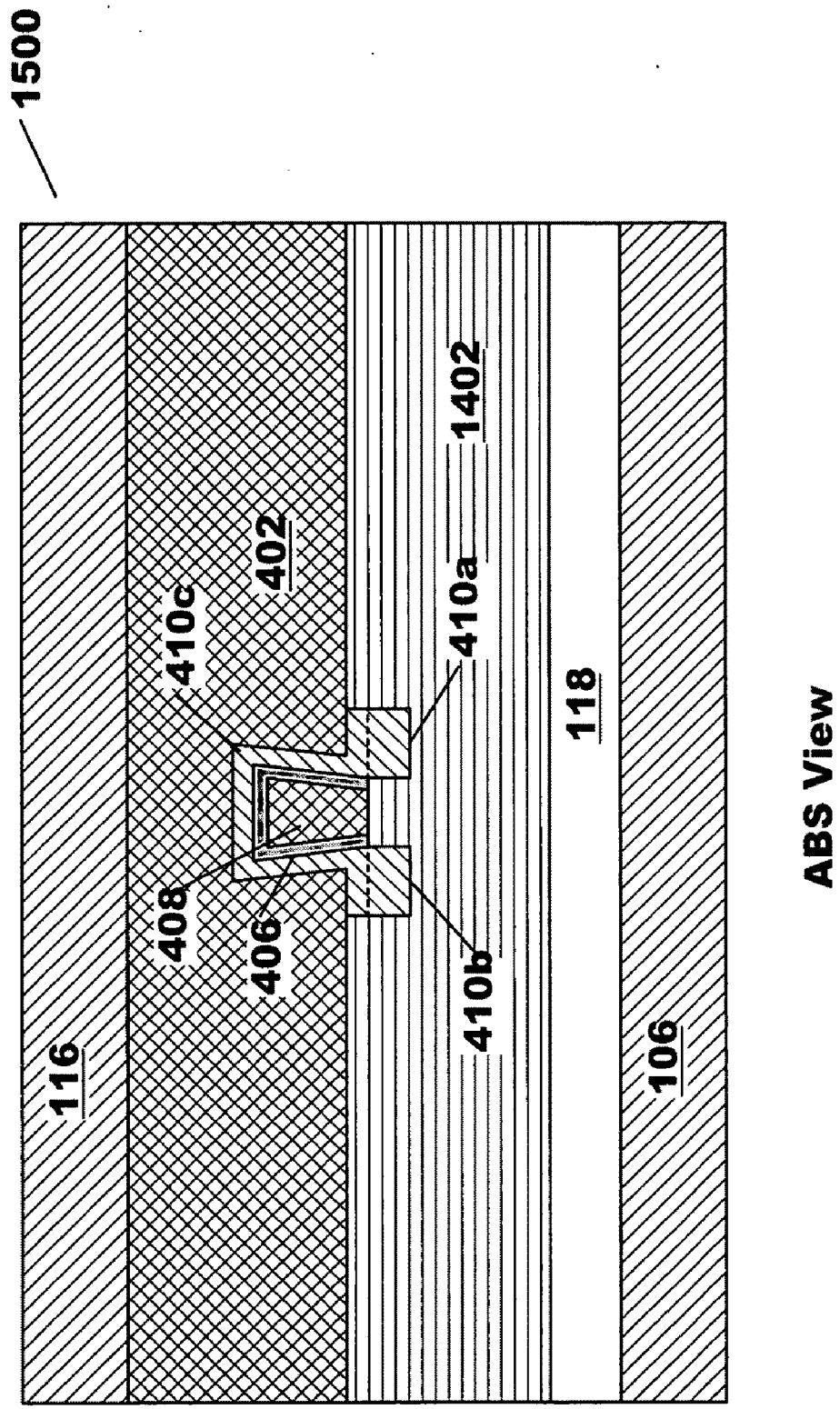
FIG. 15 is an ABS view of the structure of FIG. 14, in accordance with an embodiment of the present invention.

FIG. 14 is a partial plan view 1400 of an auxiliary half coil 410c having electrically insulating heat sinks 1402 at the ABS, in accordance with an embodiment of the present invention. FIG. 15 is an ABS view 1500 of the structure of FIG. 14. This embodiment is similar to those shown in FIGS. 4, 5, except that metal heat sinks 404a, b have been replaced by a thermally conductive, but electrically insulating heat sink 1402. Suitable materials for heat sink 1402 include, but are not limited to DLC (diamond like carbon), silicon nitrides, silicon carbides, and poly silicon. The electrically insulating nature of the heat sinks 1402 assures that a significant portion of the electrical current flowing through the auxiliary half coil 410c flows through conductive elements 410a,b.

Figure 16:
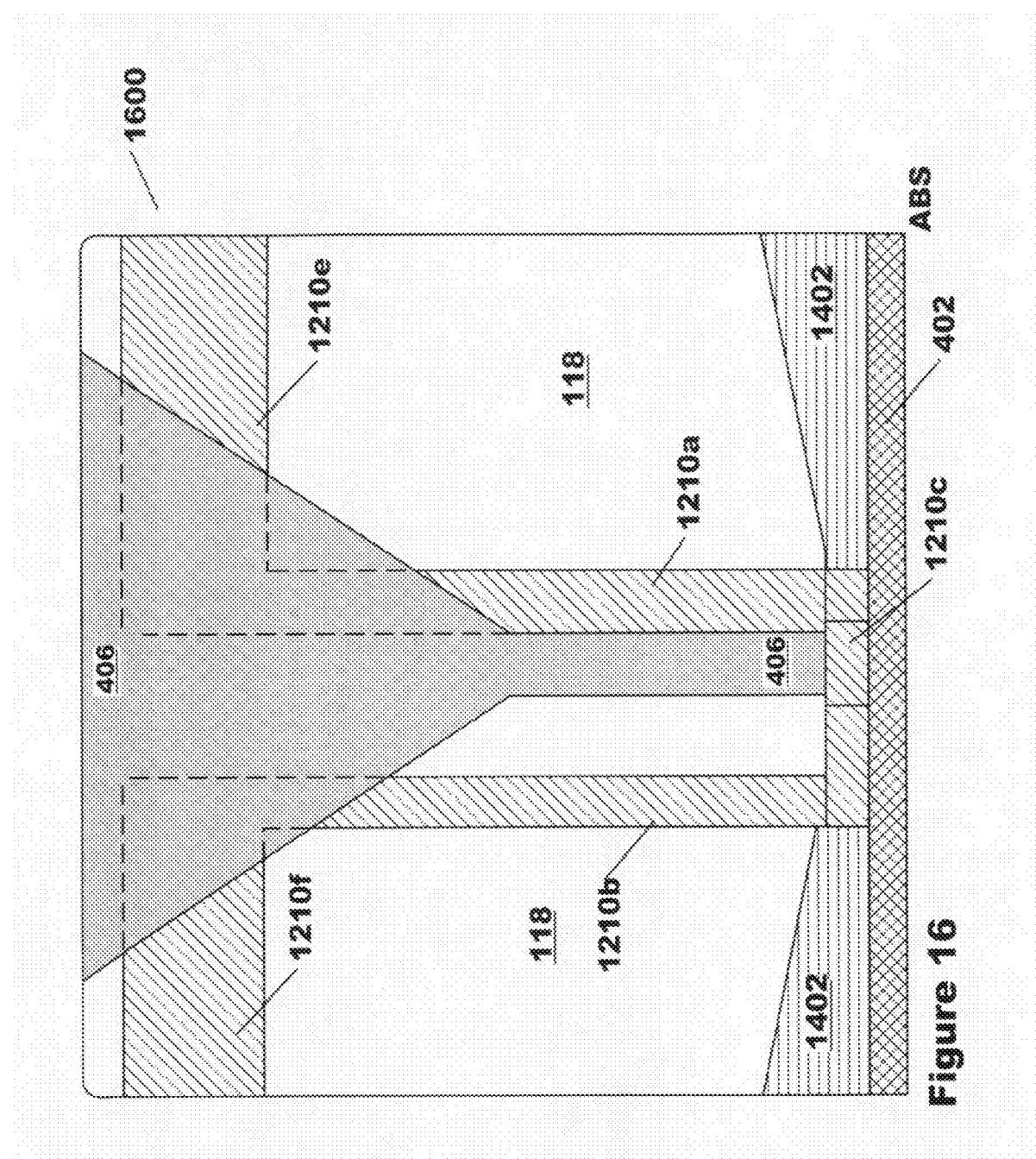
FIG. 16 is a partial plan view of an auxiliary half coil having electrically insulating heat sinks at the ABS and asymmetric current feed, in accordance with an embodiment of the present invention.
Figure 17:
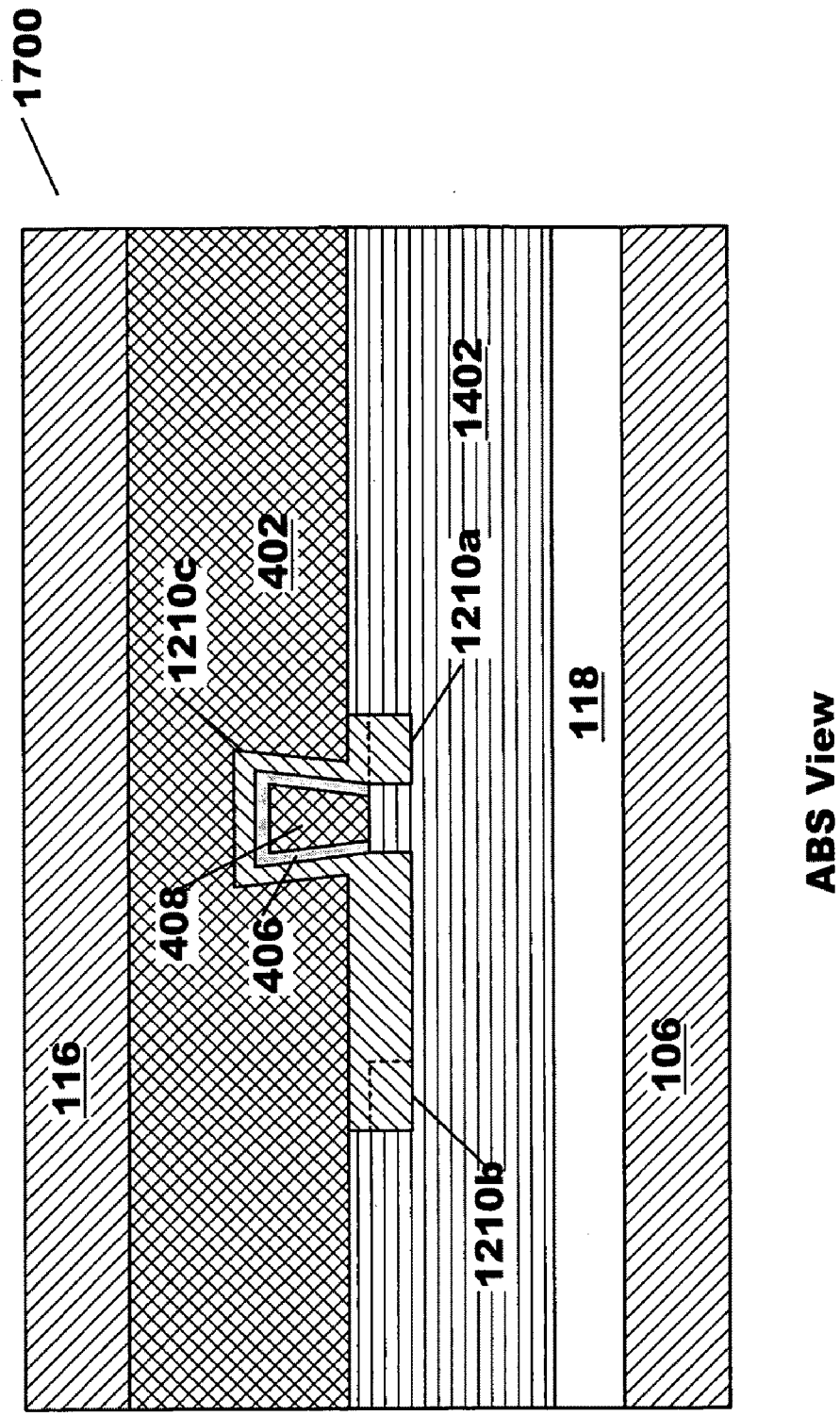
FIG. 17 is an ABS view of the structure of FIG. 16, in accordance with an embodiment of the present invention.

FIG. 16 is a partial plan view 1600 of an auxiliary half coil 1210c having electrically insulating heat sinks 1402 at the ABS and asymmetric current feed, in accordance with an embodiment of the present invention. Current is delivered to auxiliary half coil 1210c via conductive elements 1210a,b,e,f. FIG. 17 is an ABS view 1700 of the structure of FIG. 16. This embodiment is similar to that of FIGS. 14, 15, except that symmetric current feed has been replaced with asymmetric current feed. The electrically insulating nature of the heat sinks 1402 assures that a significant portion of the electrical current flowing through the auxiliary half coil 410c flows through conductive elements 1210a,b.

FIG. 18a is a plan view 1800 of an auxiliary half coil 604c having both recessed heat sinks 604e,f and electrically insulating heat sinks 1402 at the ABS, in accordance with an embodiment of the present invention. Current feed is symmetric. This embodiment combines the cooling power of both sets of heat sinks to handle higher current configurations, or to reduce temperatures further than those obtained with either a single set of recessed heat sinks or heat sinks present only at the ABS. FIG. 19a is a plan view 1900 of an auxiliary half coil 404c having both recessed heat sinks 604e,f and conductive heat sinks 404a,b at the ABS in a symmetric current feed configuration.

Figure 18B:
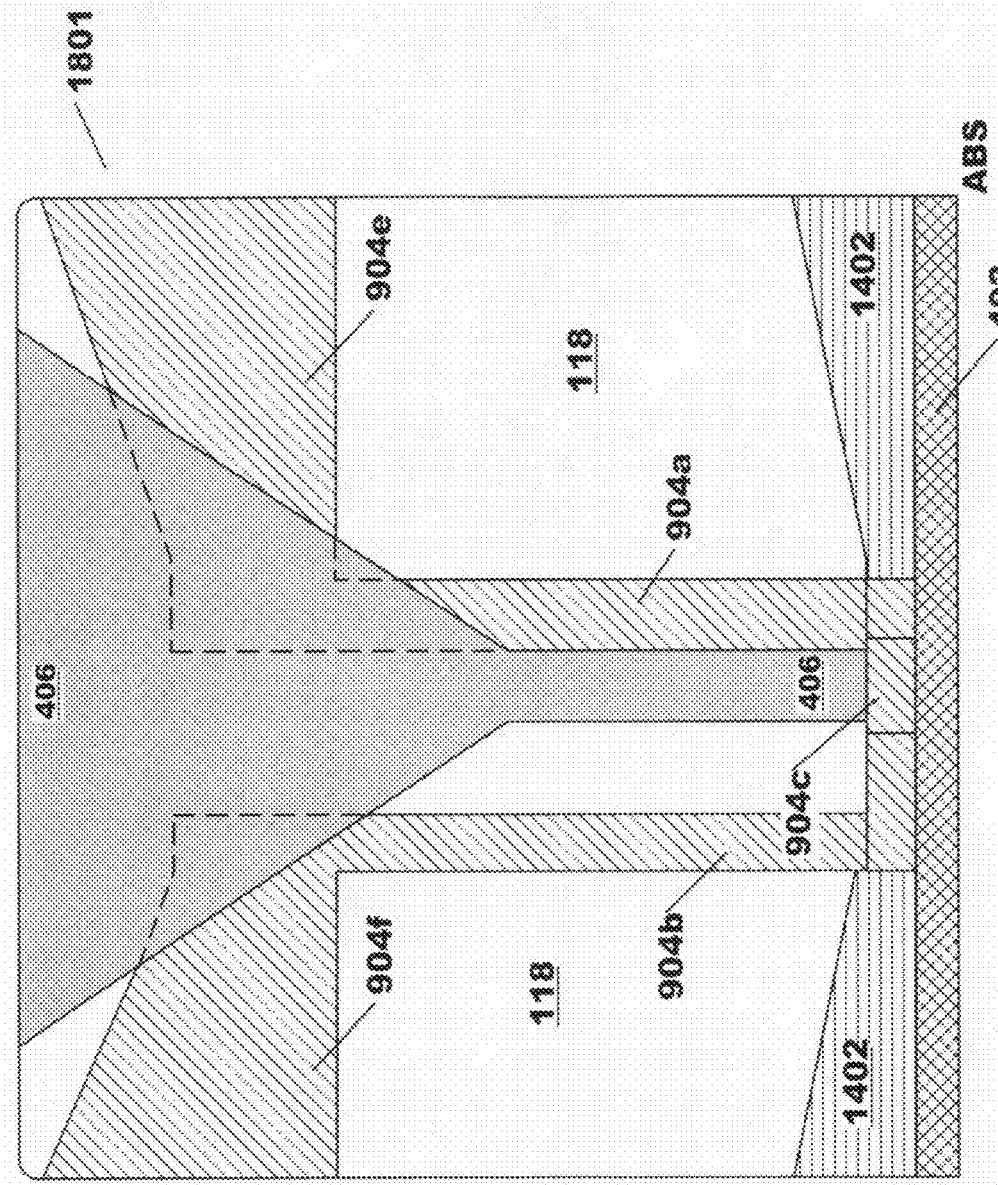
FIG. 18b is a plan view of an auxiliary half coil having recessed heat sinks, electrically insulating heat sinks at the ABS, and asymmetric current feed, in accordance with an embodiment of the present invention.
Figure 19A:
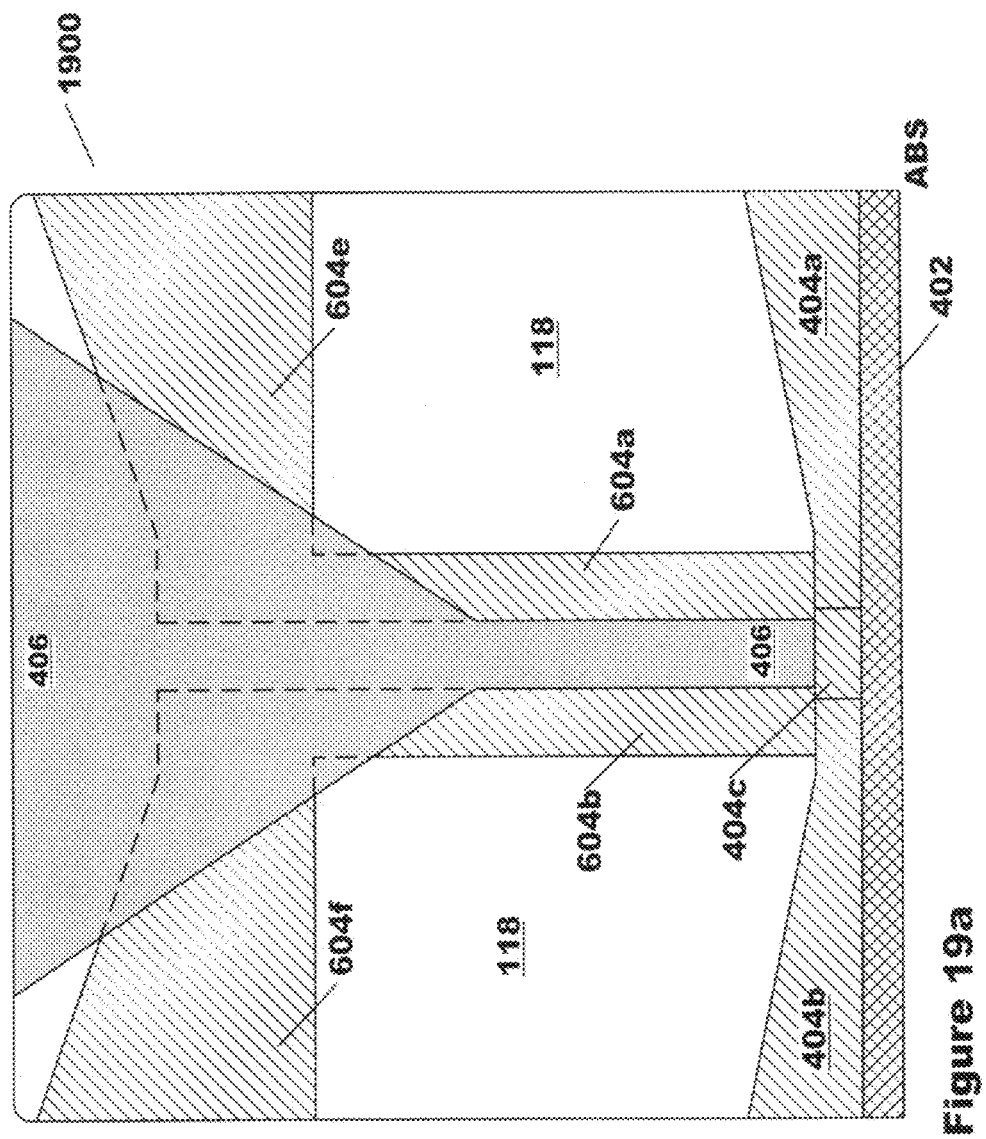
FIG. 19a is a plan view of an auxiliary half coil having both recessed heat sinks and metallic heat sinks at the ABS, in accordance with an embodiment of the present invention.
Figure 19B:
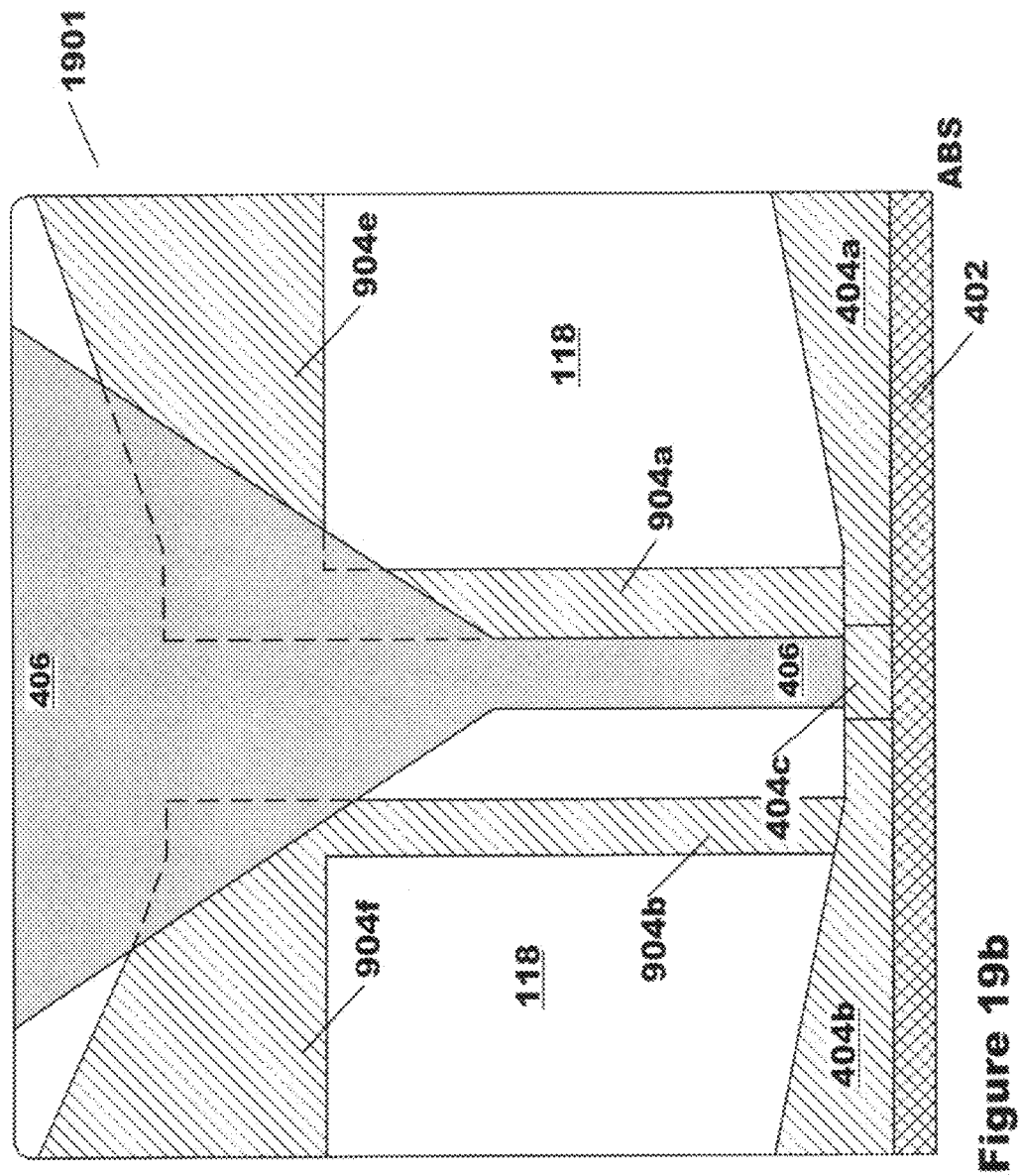
FIG. 19b is a plan view of an auxiliary half coil having recessed heat sinks, metallic heat sinks at the ABS, and asymmetric current feed, in accordance with an embodiment of the present invention.

FIG. 18b is a plan view 1801 of an auxiliary half coil 904c having recessed heat sinks 904e,f, electrically insulating heat sinks 1402 at the ABS, and asymmetric current feed, in accordance with an embodiment of the present invention. FIG. 19b is a plan view 1901 of an auxiliary half coil 404c having recessed heat sinks 904e,f, conductive heat sinks 404a,b at the ABS, and asymmetric current feed.

Figure 20:
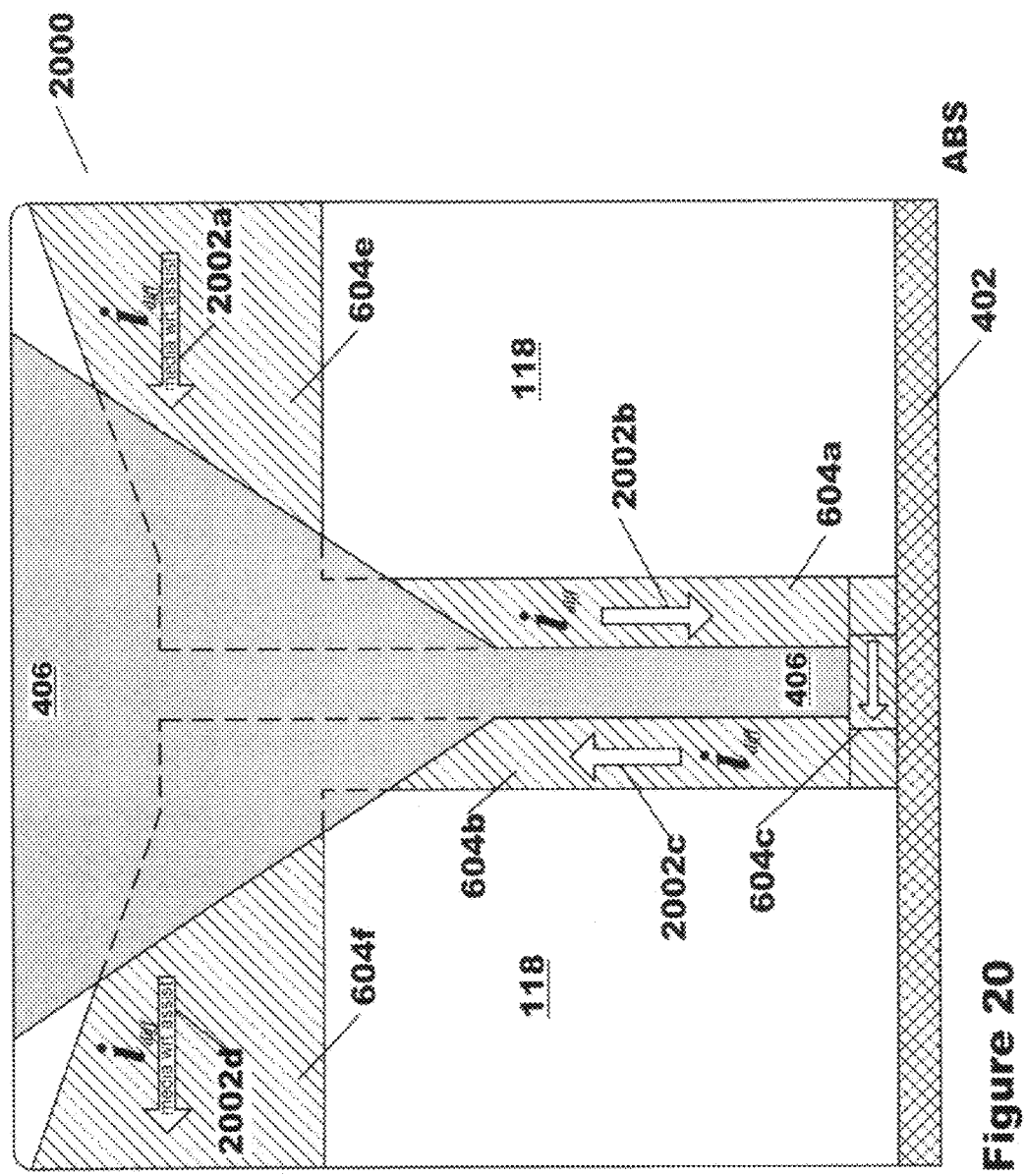
FIG. 20 is a plan view of an auxiliary half coil having differential mode current flows for media write assist and symmetric current feed, in accordance with an embodiment of the present invention.

FIG. 20 is a plan view 2000 of an auxiliary half coil 604c having differential mode current flows for media write assist and symmetric current feed, in accordance with an embodiment of the present invention. FIG. 20 illustrates the current flow paths for differential current flow through the auxiliary half coil. A structure (from FIGS. 6, 7, and 8) having recessed heat sinks is used as an example, but it will be evident to those skilled in the art that any of previously disclosed embodiments having symmetric current feed could be used. Arrows 2002a,b,c,d indicate "instantaneous" direction of flow, since currents are AC signals having RF frequencies or data-derived signals. The term "differential" refers to the case where current 2002c,d is approximately equal to current 2002a,b, but flows in opposite directions parallel to the pole. This current is approximately equal to current flowing through the auxiliary half coil 604c. Currents 2002b and 2002c may not be precisely equal if there is any current flow to common (ground) via parasitic capacitance effects. These parasitic currents are expected to be small in comparison to the main current flow due to the low impedance of the auxiliary half coil and conductors 604a,b,e,f. For media write assist, the differential current flow through the half coil is significant.

As an example, current levels on the order of 10 to 15 mA are required to produce a 1K Oe vertical magnetic field strength. These levels produce a current density of 1 to $2\times10^9$ A/cm$^2$ in a auxiliary half coil of cross section dimensions of about 20 nm×40 nm. RF frequencies for media write assist are between 10 and 50 GHz. Although significant, these current levels are considerably lower than WAMR heads of the prior art which can require as much as 80 to 100 mA.

Figure 21:
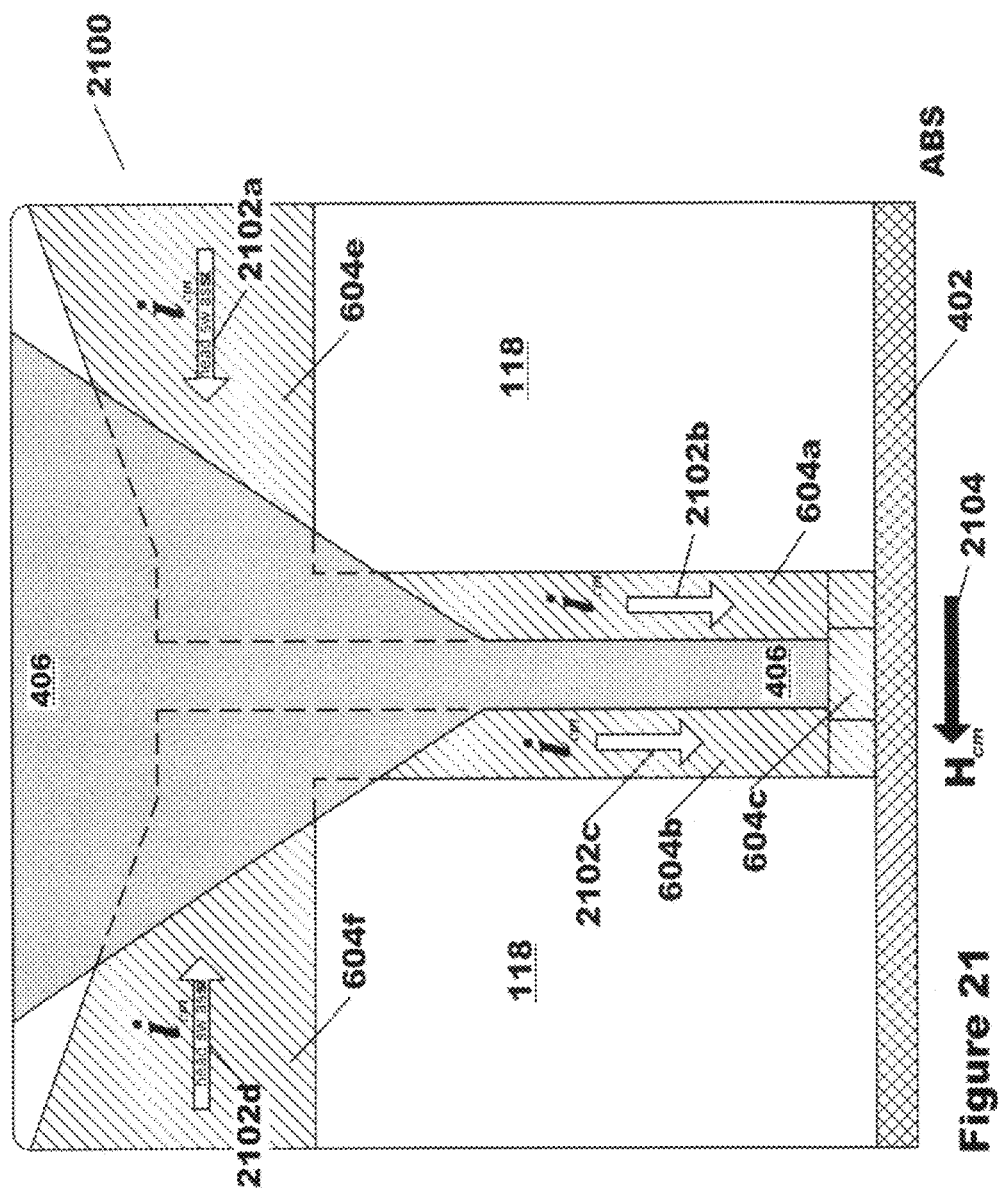
FIG. 21 is a plan view of an auxiliary half coil having common mode current flows for head switching assist and symmetric current feed, in accordance with an embodiment of the present invention.

FIG. 21 is a plan view 2100 of an auxiliary half coil 604c having common mode current flows for head switching assist and symmetric current feed, in accordance with an embodiment of the present invention. In order to provide the second write assist component, head switching assist, an in-plane (horizontal) magnetic field 2104 must be provided at the pole tip (at the ABS). One method for doing this is to generate two common mode currents 2102c and 2102b in each of two conductive elements 604b and 604a, respectively. The term "common mode" refers to currents in conductors 604a, 604b having the same "instantaneous" flow direction parallel to the pole. Currents 2102 are AC signals having RF frequencies about an order of magnitude lower than those used for media write assist or a data-derived signal. Since the currents in conductive elements 604a and 604b are flowing in the same direction, the horizontal magnetic field components created by these current reinforce, creating a magnetic field $H_{cm}$, 2104 of approximately 100 to 200 Oe.

Figure 22:
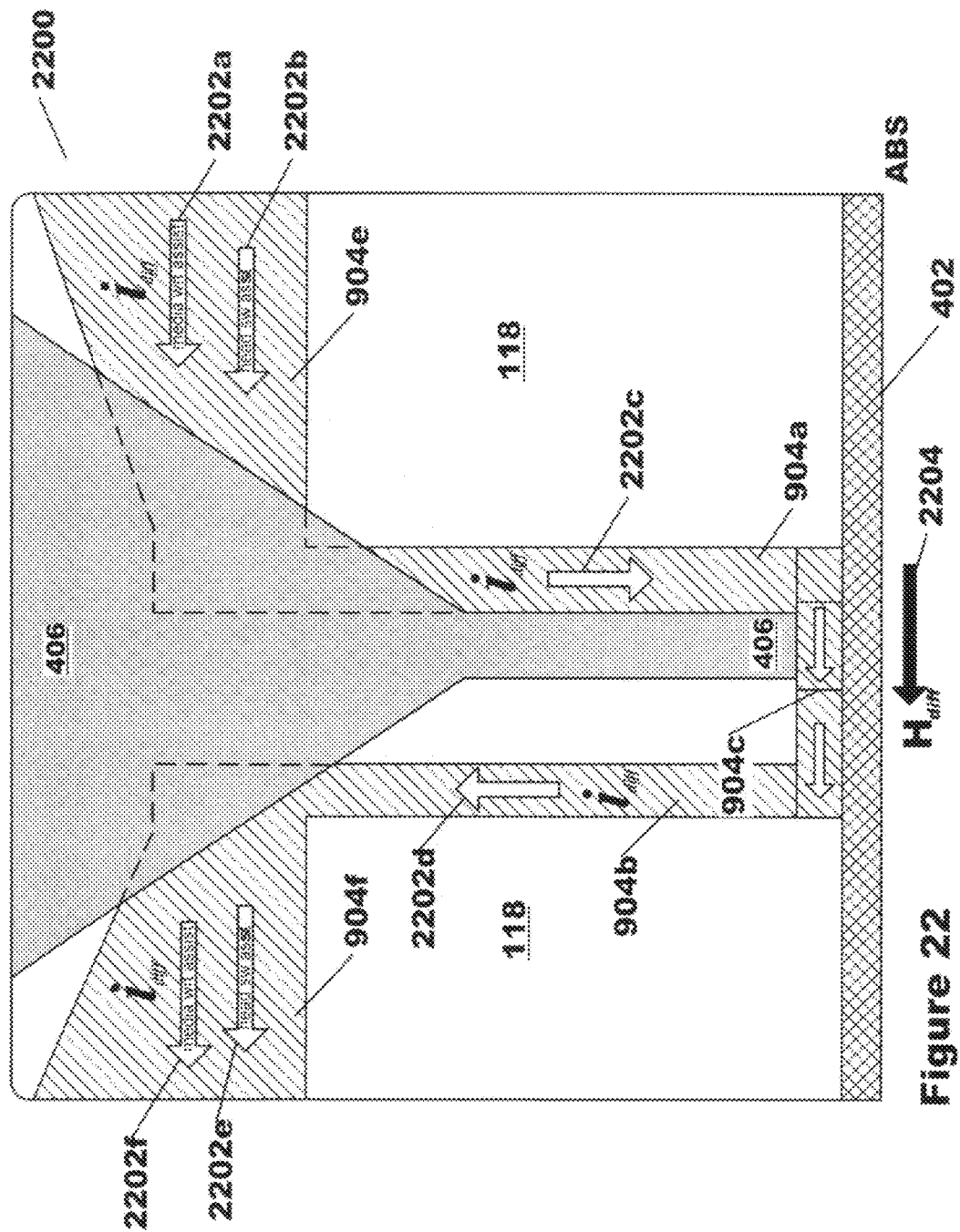
FIG. 22 is a plan view of an auxiliary half coil having differential mode current flows for both head switching assist and media write assist, using asymmetric current feed, in accordance with an embodiment of the present invention.

FIG. 22 is a plan view 2200 of an auxiliary half coil 904c having differential mode current flows for both head switching assist and media write assist, using asymmetric current feed, in accordance with an embodiment of the present invention. A structure (from FIGS. 9, 10, and 11) having recessed heat sinks is used as an example, but it will be evident to those skilled in the art that any of previously disclosed embodiments having asymmetric current feed could be used. The use of an asymmetric current feed geometry allows the use of differential current flow to generate both media write assist and head switching assist. For media write assist, the explanation is exactly as discussed above in FIGS. 20, 21 and won't be repeated. For head switching assist, differential current flows can be used to generate a in-plane (horizontal) field $H_{diff}$ 2204 because one conductor 904a is in close proximity to the pole, and the horizontal field is dominated by current 2202c flowing in this conductor element. Current flowing away from the half coil 904c would normally produce an equal and opposite magnetic field component that would reduce $H_{diff}$ to zero, if the return conductive element 904b were residing immediately adjacent the pole. However, relocating 904b to a position displaced from the pole significantly reduces the impact of an opposing magnetic field component, allowing a significant field component $H_{diff}$ to remain to provide the desired head switching assist function.

The present invention is not limited by the previous embodiments heretofore described. Rather, the scope of the present invention is to be defined by these descriptions taken together with the attached claims and their equivalents.

What is claimed is:

1. A perpendicular head comprising:
a pole layer, said pole layer having a flare point;
a main coil, said main coil having a plurality of turns operable to affect the magnetization state of said pole layer;
an auxiliary half coil, extending around three sides of said pole layer at an air bearing surface, said auxiliary half coil having a first terminating end and a second terminating end;
a first conductive element coupled to said first terminating end of said auxiliary half coil, said first conductive element extending from said air bearing surface, approximately perpendicular to said air bearing surface, to beyond said flare point of said pole layer, said first conductive element being displaced a first distance from said pole layer, said first distance being measured from said pole layer to said first conductive element at the air bearing surface;
a second conductive element coupled to said second terminating end of said auxiliary half coil, said second conductive element extending from said air bearing surface, approximately perpendicular to said air bearing surface, to beyond said flare point of said pole layer, said second conductive element being displaced a second distance from said pole layer, said second distance being measured from said pole layer to said second conductive element at the air bearing surface;
wherein said first distance is greater than said second distance.

2. The head as recited in claim 1, further comprising a heat sink, said heat sink thermally coupled to said first conductive element and said second conductive element.

3. The head as recited in claim 2, wherein said heat sink is located at said air bearing surface.

4. The head as recited in claim 3, wherein said, heat sink is made from a metal.

5. The head as recited in claim 3, wherein said heat sink is made from a material having a low electrical conductivity and a high thermal conductivity.

6. The head as recited in claim 5, wherein said electrical conductivity of said heat sink is less than approximately 20% of that of said auxiliary coil.

7. The head as recited in claim 5, wherein said heat sink comprises diamond like Carbon.

8. The head as recited in claim 5, wherein said heat sink comprises nitrides of silicon.

9. The head as recited in claim 5, wherein said heat sink comprises carbides of silicon.

10. The head as recited in claim 5, wherein said heat sink comprises polysilicon.

11. The head as recited in claim 2, wherein said heat sink is recessed from said air bearing surface.

12. The head as recited in claim 11, wherein said heat sink is recessed from said air bearing surface to a location beyond said flare point of said pole layer.

13. The head as recited in claim 12, wherein said heat sink is made from metal.

14. The head as recited in claim 13, wherein said heat sink serves to deliver electrical current to said auxiliary half coil.

15. The head as recited in claim 1, further comprising a shield, wherein said auxiliary half coil is disposed between said shield and said pole layer at said air bearing surface.

16. The head as recited in claim 15, wherein said shield is a wrap around shield.

17. The head as recited in claim 1, further comprising:
- a first, heat sink, said first heat sink thermally coupled to said first and said second conductive elements at the air bearing surface; and
- a second heat sink, said second heat sink recessed from said air bearing surface, said second heat sink thermally coupled to said first and said second conductive elements.

18. The head as recited in claim 17, wherein said first and said second heat sinks are made from metal.

19. The head as recited in claim 17, wherein said first heat sink is made from a material having a low electrical conductivity and a high thermal conductivity, and wherein said second heat sink is made from metal.

20. The head as recited in claim 19, wherein said first heat sink comprises diamond like carbon.

21. The head as recited in claim 19, wherein said first heat sink comprises nitrides of silicon.

22. The head as recited in claim 19, wherein said first heat sink comprises carbides of silicon.

23. The head as recited in claim 19, wherein said first heat sink comprises polysilicon.

* * * * *